United States Patent
Fujii et al.

(10) Patent No.: US 7,515,184 B2
(45) Date of Patent: Apr. 7, 2009

(54) SOLID-STATE IMAGE SENSOR, SOLID-STATE IMAGE SENSING APPARATUS, CAMERA, AND METHOD FOR CONTROLLING A SOLID-STATE IMAGE SENSOR

(75) Inventors: Toshiya Fujii, Otsu (JP); Ryoichi Nagayoshi, Nishinomiya (JP); Akiyoshi Kohno, Yokohama (JP); Shinichi Tashiro, Ibaraki (JP)

(73) Assignee: Panasonic Corporation, Osaka (JP)

( * ) Notice: Subject to any disclaimer, the term of this patent is extended or adjusted under 35 U.S.C. 154(b) by 915 days.

(21) Appl. No.: 10/992,108

(22) Filed: Nov. 19, 2004

(65) Prior Publication Data

US 2005/0117043 A1    Jun. 2, 2005

(30) Foreign Application Priority Data

Nov. 28, 2003    (JP)    ............................. 2003-399971

(51) Int. Cl.
H04N 9/083  (2006.01)
H04N 3/14   (2006.01)
H04N 5/335  (2006.01)
H04N 9/04   (2006.01)

(52) U.S. Cl. .................... 348/282; 348/311
(58) Field of Classification Search ................ 348/282, 348/311, 319, 320, 322
See application file for complete search history.

(56) References Cited

U.S. PATENT DOCUMENTS

| 6,686,960 B2 | 2/2004 | Iizuka |
| 2002/0039144 A1 | 4/2002 | Yamada |
| 2002/0158980 A1* | 10/2002 | Iizuka ..................... 348/280 |

FOREIGN PATENT DOCUMENTS

JP    2003-230054    8/2003

* cited by examiner

Primary Examiner—Tuan V Ho
Assistant Examiner—Chia-Wei A Chen
(74) Attorney, Agent, or Firm—McDermott Will & Emery LLP

(57) ABSTRACT

The present invention provides a solid-state image sensor, a solid-state image sensing apparatus, and a camera realizing a high-speed operation, all operable to output signal charges so as to maintain the light sensitivity and generate high-quality video signals free from moiré and aliased signals even if the number of pixels making up one frame of an image is reduced. The solid-state image sensor comprises a plurality of photoelectric converters, vertical transfer groups, and a horizontal transfer unit disposed at one side of the vertical transfer groups. Each vertical transfer group includes 2n+1 vertical transfer units, where n is an integer of 1 or more. Each vertical transfer unit includes a plurality of transfer electrodes arranged in columns and charge storage units receiving and storing charges from the photoelectric converters. In n out of the 2n+1 vertical transfer units, predetermined transfer electrodes disposed near the horizontal transfer unit are independent transfer electrodes.

20 Claims, 19 Drawing Sheets

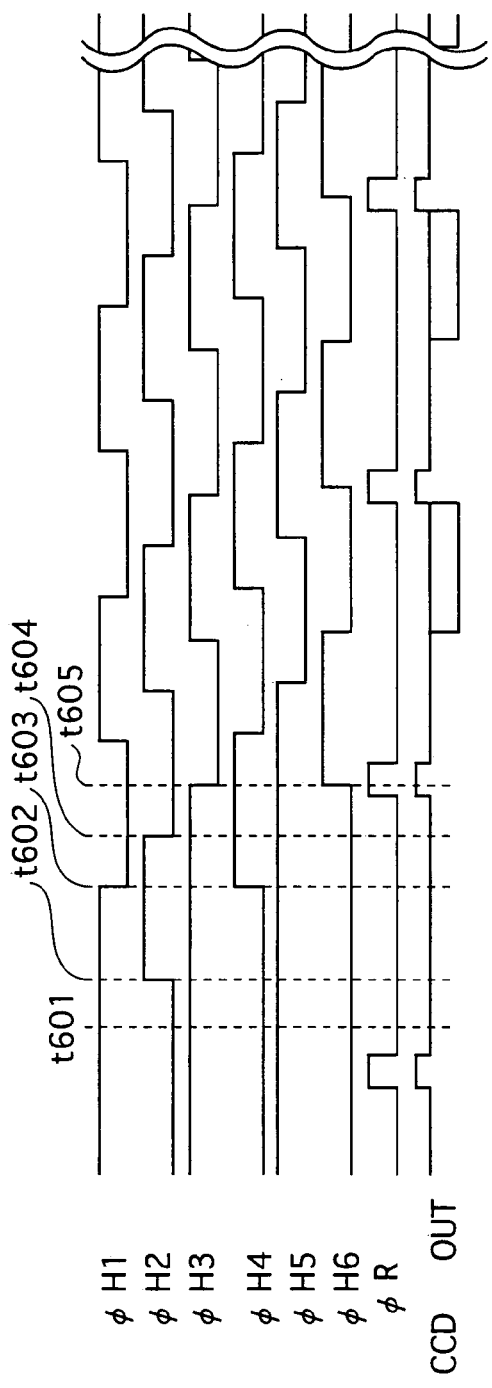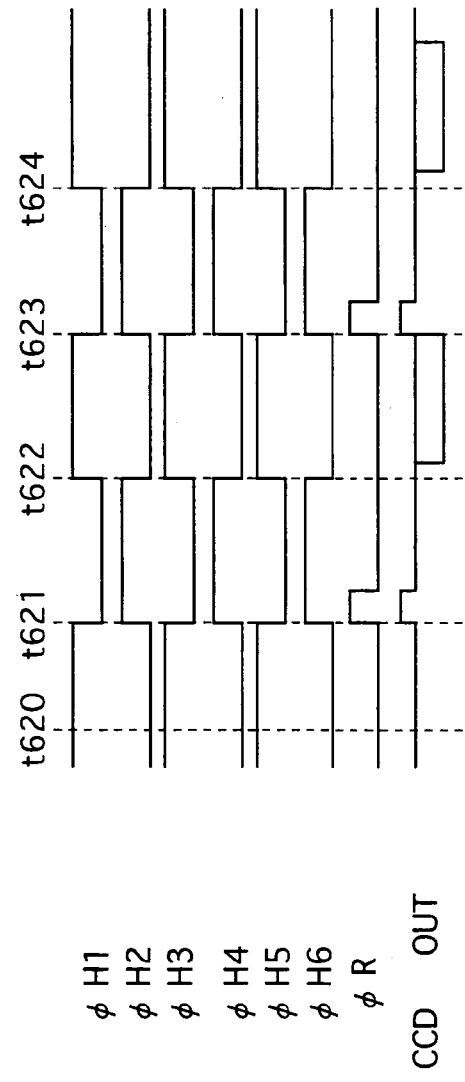
FIG. 6A  NINE-PIXEL ADDING MODE HCCD TIMING
FIG. 6B  ALL-PIXEL MODE HCCD TIMING

| COLUMNS | | | | | | | | | | | | | | | | | | |
|---|---|---|---|---|---|---|---|---|---|---|---|---|---|---|---|---|---|---|
| 2ND | 3RD | 1ST | 2ND | 3RD | 1ST | 2ND | 3RD | 1ST | 2ND | 3RD | 1ST | 2ND | 3RD | 1ST | 2ND | 3RD | 1ST | 2ND | 3RD |
| R41 | G43 | R42 | R41 | G43 | R42 | R41 | G43 | R42 | R41 | G43 | R42 | R41 | G43 | R42 | R41 | G43 |
| G31 | B33 | G32 | G31 | B33 | G32 | G31 | B33 | G32 | G31 | B33 | G32 | G31 | B33 | G32 | G31 | B33 |
| R21 | G23 | R22 | R21 | G23 | R22 | R21 | G23 | R22 | R21 | G23 | R22 | R21 | G23 | R22 | R21 | G23 |
| G11+G12+G13 | | | B11+B12+B13 | | | G11+G12+G13 | | | B11+B12+B13 | | | G11+G12+G13 | | |

FINAL VERTICAL TRANSFER BLOCK

HCCD: H1 H2 H3 H4 H5 H6 (repeating) — 6-PHASE HCCD TRANSFER

SOLID-STATE IMAGE SENSOR, SOLID-STATE IMAGE SENSING APPARATUS, CAMERA, AND METHOD FOR CONTROLLING A SOLID-STATE IMAGE SENSOR

This application is based on an application No. 2003-399971 filed in Japan, the content of which is hereby incorporated by reference.

BACKGROUND OF THE INVENTION

1. Field of the Invention

The present invention relates to an image sensing apparatus in which a series of unit cells each performing photoelectric conversion on light incident thereto are arranged on a semiconductor substrate in a one-dimensional array or in a two-dimensional matrix, in particular to a technology for improving the processing speed and light sensitivity of the image sensing apparatus.

2. Description of the Related Art

Late years, the development of a solid-state image sensing apparatus that comprises a solid-state image sensor having photoelectric converters and a drive unit thereof has been actively pursued.

The solid-state image sensing apparatus is largely used in digital cameras, such as digital still cameras and digital video cameras. There has been still a strong demand for improving image quality of digital cameras. Regarding solid-state image sensors, realizing higher-density pixels is now being accelerated at a rapid rate.

When a video is taken with a digital camera, it is not required to output the moving image at a very high resolution as for a still image. What is asked instead is to perform signal processing at a high speed.

For this purpose, a method has been proposed in which the number of pixels to be processed is reduced in the solid-state image sensors by a method of pixel skipping. In the solid-state image sensors, signal charges are generated through photoelectric conversion. According to the method, pixels are thrown out evenly throughout an image and the generated signal charges of only the remaining pixels are read out.

Additionally, Patent Document 1 (Japanese Laid-Open Patent Application No. H11-234688) for example discloses a solid-state image sensor drive method in which the number of pixels to be processed is reduced in the horizontal direction of the solid-state image sensor. According to the method, pixels are incorporated into blocks, each of which is made up of three pixels aligned next to each other in the horizontal direction. In each block, signal charges of two pixels except for the middle one (i.e. two at both ends of the block) are added together within the solid-state image sensor. The signal charge of the middle pixel is added to that of the middle pixel from the adjacent block. Thus, by adding signal charges of pixels, the disclosed drive method reduces the number of pixels to be processed in the horizontal direction of the video signals outputted from the solid-state image sensor.

In the case in which the number of pixels to be processed is reduced by one-third in the horizontal direction, a one-third component of the sampling frequency for outputting all pixels folds back and therefore the remaining two-thirds component is added to the DC component. In the solid-state image sensor driven by the above conventional method, however, the one-third component of the sampling frequency is not zero (see FIG. 15), which thereby leads to moiré and/or aliased signals, or reducing the light sensitivity due to a reduction in the sampling frequency. These incur deterioration in the image quality of the output video signals. In addition, adding signal charges of pixels causes an adverse effect in which the order of the video signals outputted from the solid-state image sensor becomes irregular, and therefore reordering of the data through image processing will be required.

In view of the above issues, the present invention aims to provide: (a) a solid-state image sensor which is capable of reducing the number of pixels to be processed, at least, in the horizontal direction of the solid-state image sensor and outputting high-quality video signals, free from moiré and aliased signals, at a high speed and with a high light sensitivity, as well as in the same orderly arrangement as when signal charges of all the pixels are read out, and (b) a solid-state image sensing apparatus and a camera provided with such a solid-state image sensor.

PATENT DOCUMENT 1: Japanese Laid-Open Patent Application No. H11-234688.

SUMMARY OF THE INVENTION

In order to solve the above-described problems, the solid-state image sensor of the present invention generates charge according to an amount of light received and outputs the generated charge. The solid-state image sensor comprises: a plurality of photoelectric converters arranged in a matrix with rows and columns, each of the photoelectric converters operable to generate charge according to an amount of light received; a plurality of vertical transfer units, each of which is disposed along each column of the photoelectric converters and includes (a) a plurality of transfer electrodes and (b) charge storage units corresponding one-to-one with the transfer electrodes, each of the charge storage units operable to store the generated charge therein and transfer the stored charge to an adjacent charge storage unit according to a voltage applied to the corresponding transfer electrode; and a horizontal transfer unit disposed in a direction of the rows along an end side of the vertical transfer units in a charge transfer direction, wherein every 2n+1 vertical transfer units aligned next to each other in the row direction are incorporated into one vertical transfer group, where n is an integer of 1 or more, and, in n out of the 2n+1 vertical transfer units within each vertical transfer group, one or more predetermined transfer electrodes disposed close to the horizontal transfer unit are independent transfer electrodes unconnected with other transfer electrodes of the vertical transfer group.

According to the above configuration, the solid-state image sensor of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, within the vertical transfer group, the transfer electrodes except the independent transfer electrodes may be connected transfer electrodes connected with other transfer electrodes of the vertical transfer group. The connected transfer electrodes are applied with an in-phase voltage.

According to the above configuration, the solid-state image sensor of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, n may be 1. In one out of three vertical transfer units within each vertical transfer group, one or more predetermined transfer electrodes disposed close to the horizontal transfer unit may be the independent transfer electrodes.

According to the above configuration, the solid-state image sensor of the present invention is capable of transferring signal charges of one out of three vertical transfer units to the horizontal transfer unit, separately from the signal charges of the remaining two vertical transfer units. Consequently, within the horizontal transfer unit, the number of pixels to be processed is reduced in the horizontal direction by adding signal charges of the intended number, here three pixels. Because signal charges corresponding to respective pixels are all used for the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, in one out of the three vertical transfer units within the vertical transfer group, the independent transfer electrodes may be at least a second and a fourth transfer electrodes from the horizontal transfer unit.

According to the above configuration, the solid-state image sensor of the present invention is capable of transferring signal charges of one out of three vertical transfer units to the horizontal transfer unit, separately from the signal charges of the remaining two vertical transfer units. Consequently, within the horizontal transfer unit, the number of pixels to be processed is reduced in the horizontal direction by adding signal charges of the intended number, here three pixels. Because signal charges corresponding to respective pixels are all used for the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, in one out of the three vertical transfer units within the vertical transfer group, the independent transfer electrodes may be at least a third and a fifth transfer electrodes from the horizontal transfer unit.

According to the above configuration, the solid-state image sensor of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, a plurality of color filters, each of which is disposed over one of the photoelectric converters, may be arranged in a cyclic pattern of two rows by two columns of the photoelectric converters.

According to the above configuration, the solid-state image sensor of the present invention has color filters arranged in a cycle of a 2×2 grid totaling four pixels and is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensor operable to output signal charges so as to generate high-quality video signals free from moiré and aliased signals can be provided.

Here, in each cyclic pattern of four photoelectric converters, two color filters in a diagonal line may have a first color, and remaining two color filters may have a second and a third colors respectively.

According to the above configuration, the color filters are arranged in the Bayer pattern and therefore a solid-state image sensor operable to output signal charges so as to correspond to high image quality video signals can be provided.

The solid-state image sensing apparatus of the present invention comprises a solid-state image sensor and the controller. The solid-state image sensor includes: a plurality of photoelectric converters which are arranged in a matrix with rows and columns and operable to generate charges according to an amount of light received, a plurality of vertical transfer units, each of which is disposed along each column of the photoelectric converters and includes (a) a plurality of vertical transfer electrodes and (b) vertical charge storage units corresponding one-to-one with the vertical transfer electrodes, and a horizontal transfer unit which is disposed in a direction of the rows along an end side of the vertical transfer units in a charge transfer direction and includes (a) horizontal transfer electrodes, two of which are disposed in the direction of the rows with respect to each of the vertical transfer units and (b) horizontal charge storage units corresponding one-to-one with the horizontal transfer electrodes, wherein the vertical and horizontal charge storage units are operable to store the generated charges therein and transfer the stored charges to adjacent charge storage units according to voltages applied to the corresponding transfer electrodes, and every 2n+1 vertical transfer units aligned next to each other in the row direction are incorporated into one vertical transfer group, where n is an integer of 1 or more, and, in n out of the 2n+1 vertical transfer units within each vertical transfer group, one or more predetermined transfer electrodes disposed close to the horizontal transfer unit are independent transfer electrodes unconnected with other transfer electrodes of the vertical transfer group. The controller is operable to systematically apply control voltages to the vertical and horizontal transfer electrodes so as to execute charge transfer operations in a predetermined order of (i) to (iv): (i) among charges stored within the n vertical transfer units disposed, in the vertical transfer group, on an opposite side from a predetermined direction of outputting the charges, charges stored in the vertical charge storage units located closest to the horizontal transfer unit are vertically transferred to the horizontal transfer unit, (ii) the transferred charges of the operation (i) are horizontally transferred to a position shifted in the predetermined direction of outputting the charges by one of 2n, 2n+1, and 2n+2 rows, (iii) among charges stored within the vertical transfer units except the n vertical transfer units, charges stored in the vertical charge storage units located closest to the horizontal transfer unit are vertically transferred to the horizontal transfer unit, and (iv) the transferred charges of the operations (ii) and (iii) are horizontally transferred in a 4n+2 phase-mode.

The charge transfer method of the present invention is executed by a controller for controlling a solid-state image sensor that includes: (a) a plurality of photoelectric converters, (b) a plurality of vertical transfer units, and (c) a horizontal transfer unit. The photoelectric converters are arranged in a matrix with rows and columns and operable to generate charges according to an amount of light received. Each of the vertical transfer units is disposed along each column of the photoelectric converters and includes a plurality of vertical transfer electrodes and vertical charge storage units corresponding one-to-one with the vertical transfer electrodes. The horizontal transfer unit is disposed in the direction of the rows along the end side of the vertical transfer unit in the charge transfer direction, and includes horizontal transfer electrodes, two of which are disposed in the direction of the rows with respect to each of the vertical transfer units and horizontal charge storage units corresponding one-to-one with the horizontal transfer electrodes. Here, the vertical and horizontal charge storage units is operable to store the generated charges therein and transfer the stored charges to adjacent charge storage units according to voltages applied to the corresponding transfer electrodes. Every 2n+1 vertical transfer units aligned next to each other in the row direction is incorporated into one vertical transfer group, where n is an integer of 1 or more. In n out of the 2n+1 vertical transfer units within each vertical transfer group, one or more predetermined transfer electrodes disposed close to the horizontal transfer unit is independent transfer electrodes unconnected with other transfer electrodes of the vertical transfer group. The controller systematically applies control voltages to the vertical and horizontal transfer electrodes. The charge transfer method comprises the following steps. (i) Among charges stored within the n vertical transfer units disposed, in the vertical transfer group, on an opposite side from a predetermined direction of outputting the charges, charges stored in the vertical charge storage units located closest to the horizontal transfer unit are vertically transferred to the horizontal transfer unit. (ii) The transferred charges of the step (i) are horizontally transferred to a position shifted in the predetermined direction of outputting the charges by one of 2n, 2n+1, and 2n+2 rows. (iii) Among charges stored within the vertical transfer units except the n vertical transfer units, charges stored in the vertical charge storage units located closest to the horizontal transfer unit are vertically transferred to the horizontal transfer unit. (iv) The transferred charges of the steps (ii) and (iii) are horizontally transferred in a 4n+2 phase-mode.

According to the configuration or the method described above, the solid-state image sensing apparatus of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensing apparatus operable to output signal charges so as to generate high-quality video signals free from moiré and aliased signals can be provided.

Here, within the vertical transfer group, the transfer electrodes except the independent transfer electrodes may be connected transfer electrodes connected with other transfer electrodes of the vertical transfer group. The connected transfer electrodes are applied with an in-phase voltage.

According to the above configuration, the solid-state image sensing apparatus of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensing apparatus operable to output signal charges so as to generate high-quality video signals free from moiré and aliased signals can be provided.

Here, the controller further may apply the control voltages to the vertical transfer electrodes so as to add charges generated by 2 m+1 photoelectric converters each of which placed in every other photoelectric converter in the direction of the columns, where m is an integer of 1 or more.

According to the above configuration, the amount of data in one frame of an image is $1/((2m+1) \times (2n+1))$. As a result, the number of image frames processed per unit time can be increased.

Here, n may be 1. In one out of three vertical transfer units within each vertical transfer group, one or more predetermined vertical transfer electrodes disposed close to the horizontal transfer unit may be the independent transfer electrodes. The charge transfer operations may comprise: (i) among charges stored within the one vertical transfer unit disposed, within the vertical transfer group, on the opposite side from the predetermined direction, charges stored in the vertical charge storage unit located closest to the horizontal transfer unit are vertically transferred to the horizontal transfer unit; (ii) the transferred charges of the operation (i) are horizontally transferred to a position, corresponding to one of 2, 3, and 4 rows of the photoelectric converters, shifted in the predetermined direction of outputting the charges; (iii) among charges stored within remaining two vertical transfer units, charges stored in the vertical charge storage units located closest to the horizontal transfer unit are vertically transferred to the horizontal transfer unit; and (iv) the transferred charges of the operations (ii) and (iii) are horizontally transferred in a six phase-mode.

Here, in the case of the charge transfer method, in the step (i), among charges stored within one vertical transfer unit disposed, within the vertical transfer group that is made of three vertical transfer units, on the opposite side from the predetermined direction, charges stored in the vertical charge storage unit located closest to the horizontal transfer unit are vertically transferred to the horizontal transfer unit. In the step (ii), the transferred charges of the step (i) are horizontally transferred to a position, corresponding to one of 2, 3, and 4 rows of the photoelectric converters, shifted in the predetermined direction of outputting the charges. In the step (iii), among charges stored within remaining two vertical transfer units, charges stored in the vertical charge storage units located closest to the horizontal transfer unit are vertically transferred to the horizontal transfer unit. In the step (iv), the transferred charges of the steps (ii) and (iii) are horizontally transferred in a six phase-mode.

According to the configuration or the method described above, the solid-state image sensing apparatus of the present invention is capable of transferring signal charges of one out of three vertical transfer units to the horizontal transfer unit, separately from the signal charges of the remaining two vertical transfer units. Consequently, within the horizontal transfer unit, the number of pixels to be processed is reduced in the horizontal direction by adding signal charges of the intended number, here three pixels. Because signal charges corresponding to respective pixels are all used for the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensing apparatus operable to output signal charges so as to generate high-quality video signals free from moiré and aliased signals can be provided.

Here, the controller may further apply the control voltages to the vertical transfer electrodes so as to (a) add charges together generated by three photoelectric converters each of which placed in every other photoelectric converter in the direction of the columns, and (b) vertically transfer the added charges.

According to the above configuration, the amount of data to be processed, which is corresponding to signal charges, is reduced to one third in the direction of the columns. Consequently, the amount of data to be processed per unit time can be increased. In addition, since no signal charges are discarded, a solid-state image sensing apparatus with high light sensitivity can be provided.

Here, the controller may further apply the control voltages to the vertical transfer electrodes so as to (a) discard, among charges generated by three photoelectric converters each of which placed in every other photoelectric converter in the direction of the columns, a charge generated by a middle photoelectric converter of the three, (b) add charges generated by remaining two photoelectric converters, and (c) vertically transfer the added charges.

According to the above configuration, the amount of data to be processed, which is corresponding to signal charges, is reduced to one third in the direction of the columns. Consequently, the amount of data to be processed per unit time can be increased.

Here, the controller further applies the control voltages to the vertical transfer electrodes so as to (a) discard, among charges generated by three photoelectric converters each of which placed in every other photoelectric converter in the direction of the columns, charges generated by photoelectric converters at both ends of the three, and (b) vertically transfer a remaining charge generated by a middle photoelectric converter.

According to the above configuration, the amount of data to be processed, which is corresponding to signal charges, is reduced to one third in the direction of the columns. Consequently, the amount of data to be processed per unit time can be increased.

Here, a plurality of color filters, each of which is disposed over one of the photoelectric converters, may be arranged in a cyclic pattern of two rows by two columns of the photoelectric converters.

According to the above configuration, the solid-state image sensing apparatus of the present invention has color filters arranged in a cycle of a 2×2 grid totaling four pixels and is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensing apparatus operable to output signal charges so as to generate high-quality video signals free from moiré and aliased signals can be provided.

Here, in the cyclic pattern, two color filters in a diagonal line may have a first color, and remaining two color filters may have a second and a third colors respectively.

According to the above configuration, the color filters are arranged in the Bayer pattern and therefore a solid-state image sensing apparatus operable to output signal charges so as to correspond to high image quality video signals can be provided.

Here, a plurality of color filters, each of which is disposed over one of the photoelectric converters, may be arranged in a cyclic pattern of two rows by four columns of the photoelectric converters, and two adjacent photoelectric converters each may be incorporated into a cyclic patter of single blocks. The controller may further apply the control voltages to the vertical transfer electrodes so as to add charges with respect to each of the single blocks.

According to the above configuration, the solid-state image sensing apparatus of the present invention is capable of transferring signal charges of n out of 2n+1 vertical transfer units to the horizontal transfer unit, separately from the signal charges of the remaining n+1 vertical transfer units. Consequently, within the horizontal transfer unit, the number of pixels to be processed is reduced in the horizontal direction by adding signal charges of an intended number, 2n+1 pixels. Because signal charges corresponding to respective pixels are all used for the processing, i.e. no signal charges are discarded during the processing, the light sensitivity is maintained. Due to a reduction in the number of pixels to be processed, the image processing can be conducted at a high speed. In addition, the orderly arrangement and centers of pixels are kept in the same manner as when the all pixels of the image are read out. Herewith, a solid-state image sensing apparatus operable to output signal charges so as to generate high-quality video signals free from moiré and aliased signals can be provided.

The camera of the present invention has the above solid-state image sensor.

This configuration allows the digital camera to operate at high speed since the data is rapidly outputted from the solid-state image sensor as well as to achieve enhanced image quality.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 6A and 6B show partially enlarged views of the drive waveforms;

FIG. 10 is another state transition diagram schematically showing the transfer operation of the solid-state image sensor 1 under the control of the controller;

FIG. 11 is another state transition diagram schematically showing the transfer operation of the solid-state image sensor 1 under the control of the controller;

DESCRIPTION OF THE PREFERRED EMBODIMENT

1. Overall Description

The following gives an account of one of the best embodiments of the present invention in conjunction with the accompanying drawings.

Figure 1:
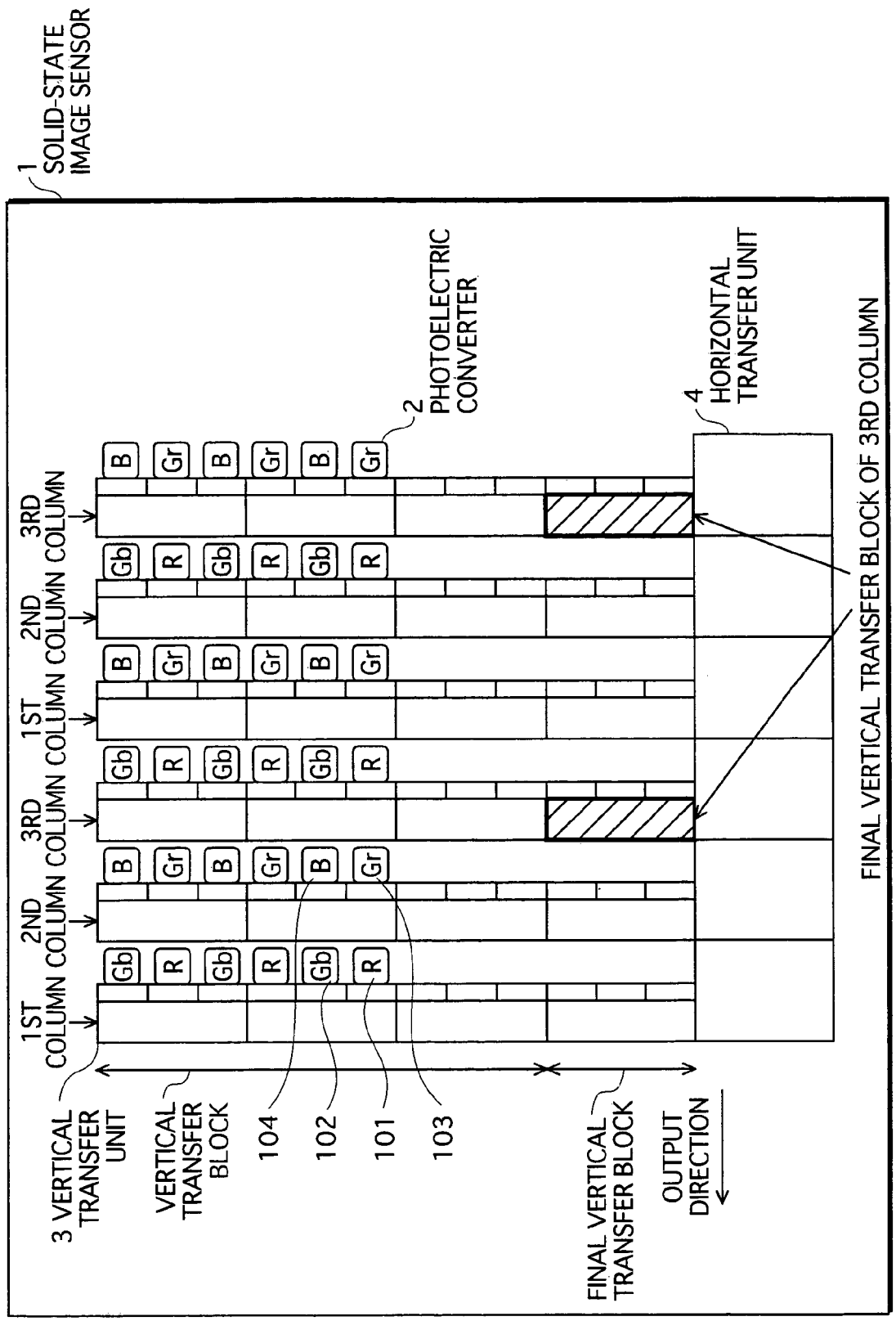
FIG. 1 shows a schematic configuration of a solid-state image sensor 1 according to the present embodiment.

FIG. 1 shows a schematic configuration of a solid-state image sensor 1 according to the present embodiment.

The solid-state image sensor 1 comprises photoelectric converters 2, each of which corresponds to a pixel, vertical transfer units 3, and a horizontal transfer unit 4. The photoelectric converters 2 are arranged in a pattern of a two-dimensional matrix (rows and columns).

The photoelectric converters 2 are made up of photodiodes.

As shown in FIG. 1, each of the photoelectric converters 2 is provided with one of three color filters: red (R), green (G), and blue (B). The color filters are disposed so that each of the colors is found in every other pixel in both vertical and horizontal directions.

The color filters are arranged into the Bayer pattern which has repeating units of 2×2 (i.e. four pixel). FIG. 1 illustrates the repeating units of the Bayer pattern in each of which the lower left pixel is R, the lower right and upper left pixels are G, and the upper right pixel is B.

With a more detailed look at FIG. 1, for example, one repeating unit of the color filters in the Bayer pattern is composed of pixels 101, 102, 103 and 104. R is placed over the pixel 101, B is placed over the pixel 104, and G is placed over two pixels 102 and 103.

Gb in FIG. 1 denotes a pixel with a green color filter adjacent to a pixel with a blue color filter in the horizontal direction, while Gr denotes a pixel with a green color filter adjacent to a pixel with a red color filter in the horizontal direction.

In the present embodiment, a 'pixel' refers to a photoelectric converter with a color filter placed thereon.

Each of the vertical transfer units 3 is composed of CCDs (Charge-Coupled Devices), and has a dedicated column of pixels for signal charge transfer. There are as many vertical transfer units 3 as the columns of pixels.

The horizontal transfer unit 4 is also composed of CCDs, and transfers signal charges, which have been transferred by each vertical transfer unit, in the output direction shown in FIG. 1.

The solid-state image sensor 1 operates according to control signals input to transfer electrodes, which are included in the vertical and horizontal transfer units 3 and 4, from a controller (not shown) provided outside the solid-state image sensor 1.

The controller may be integrally formed with the solid-state image sensor 1.

In the present embodiment, each vertical transfer unit 3 is sequentially divided into sections, each of which corresponds to three pixels, from an upstream side (i.e. the farthest side from the horizontal transfer unit 4) to a downstream side (i.e. the closest side to the horizontal transfer unit 4) of the photoelectric converters 2. Here, these sections are referred to as vertical transfer blocks. Additionally, in each vertical transfer unit 3, the vertical transfer block closest to the horizontal transfer unit 4 is called a final vertical transfer block.

Respective vertical transfer blocks other than the final vertical transfer blocks have the same configuration in the transfer electrodes.

According to the above configuration, the signal charges of three pixels of the same color, found in every other pixel, in each vertical transfer unit 3 can be added together. Resultantly, this confers an advantage of increasing the amount of signal charges transferred by one vertical transfer block.

In addition, three vertical transfer units 3 of the solid-state image sensor 1 make up a vertical transfer group. The three vertical transfer units in each vertical transfer group are referred to as a 1st, 2nd, and 3rd column, respectively, from the closest side of the output direction.

Under the control of the controller, the vertical transfer units 3 and the horizontal transfer unit 4 transfer signal charges, and thereby the solid-state image sensor 1 adds together the signal charges for three pixels of the same color found in every other pixel in the horizontal direction. As a result, the number of pixels to be processed is reduced to one third in the horizontal direction.

Figure 2A:
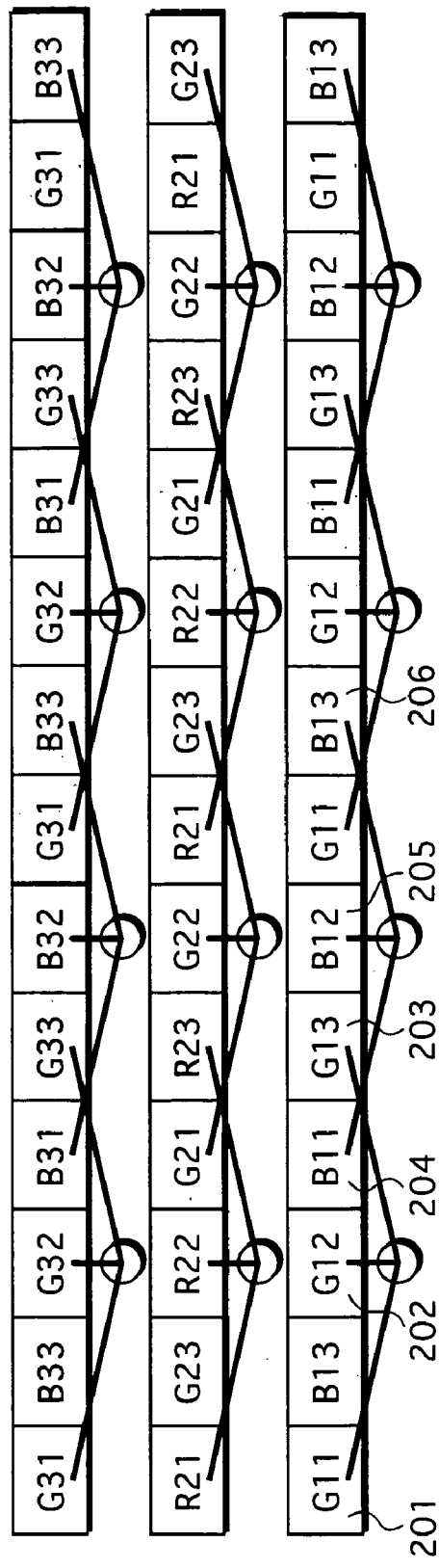
FIGS. 2A and 2B are pattern diagrams of combinations of pixels whose signal charges are added together.
Figure 2B:
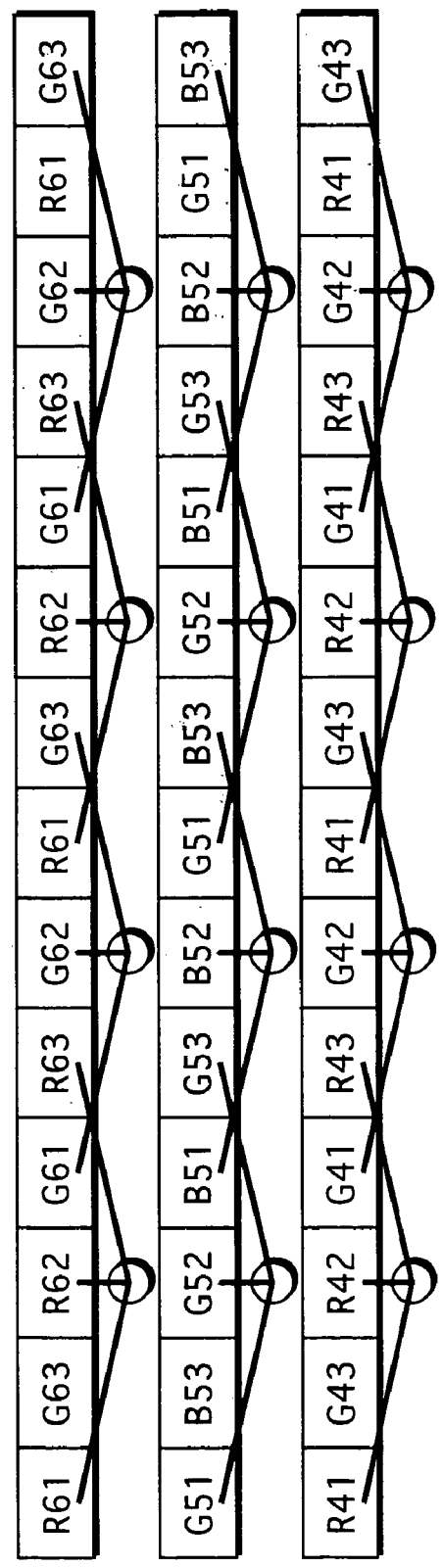

FIGS. 2A and 2B are pattern diagrams of combinations of pixels whose signal charges are added together.

Three pixels of the same color, each found in every other pixel in the horizontal direction, make up a pixel-adding group. For instance, pixels 201 (G11), 202 (G12) and 203 (G13), as shown in FIG. 2A, constitute one pixel-adding group.

Symbols in FIGS. 2A and 2B indicated as Rxy each depict pixels, where R (or G or B) indicates a filter color of the pixel, x indicates a location of the pixel in the vertical direction within the matrix of the photoelectric converters (each row is assigned a number: 1, 2, . . . , from the closest side to the horizontal transfer unit 4), and y indicates a location of the pixel within the corresponding pixel-adding group (the three pixels within the pixel-adding group are assigned numbers: 1, 2, and 3, respectively, from the closest side of the output direction of the horizontal transfer unit 4).

The solid-state image sensor 1 adds signal charges together corresponding to individual pixels in each of the pixel-adding groups.

In a similar fashion, pixels 204 (B11), 205 (B12), and 206 (B13) make up one pixel-adding group, corresponding to blue.

FIGS. 2A and 2B indicate centers of pixel-adding groups with open circles. As shown in the figure, the centers of pixel-adding groups are evenly spaced apart from each other in the horizontal direction.

In sum, pixels of two different colors are alternately aligned in each row as described above. By adding the signal charges of three pixels of the same color, the centers of pixel-adding groups are evenly spaced apart from each other. Hereby, no moiré and aliased signals are produced.

The following gives an account of operations for adding signal charges generated in respective pixels of each pixel-adding group.

2. Configuration

Figure 3:
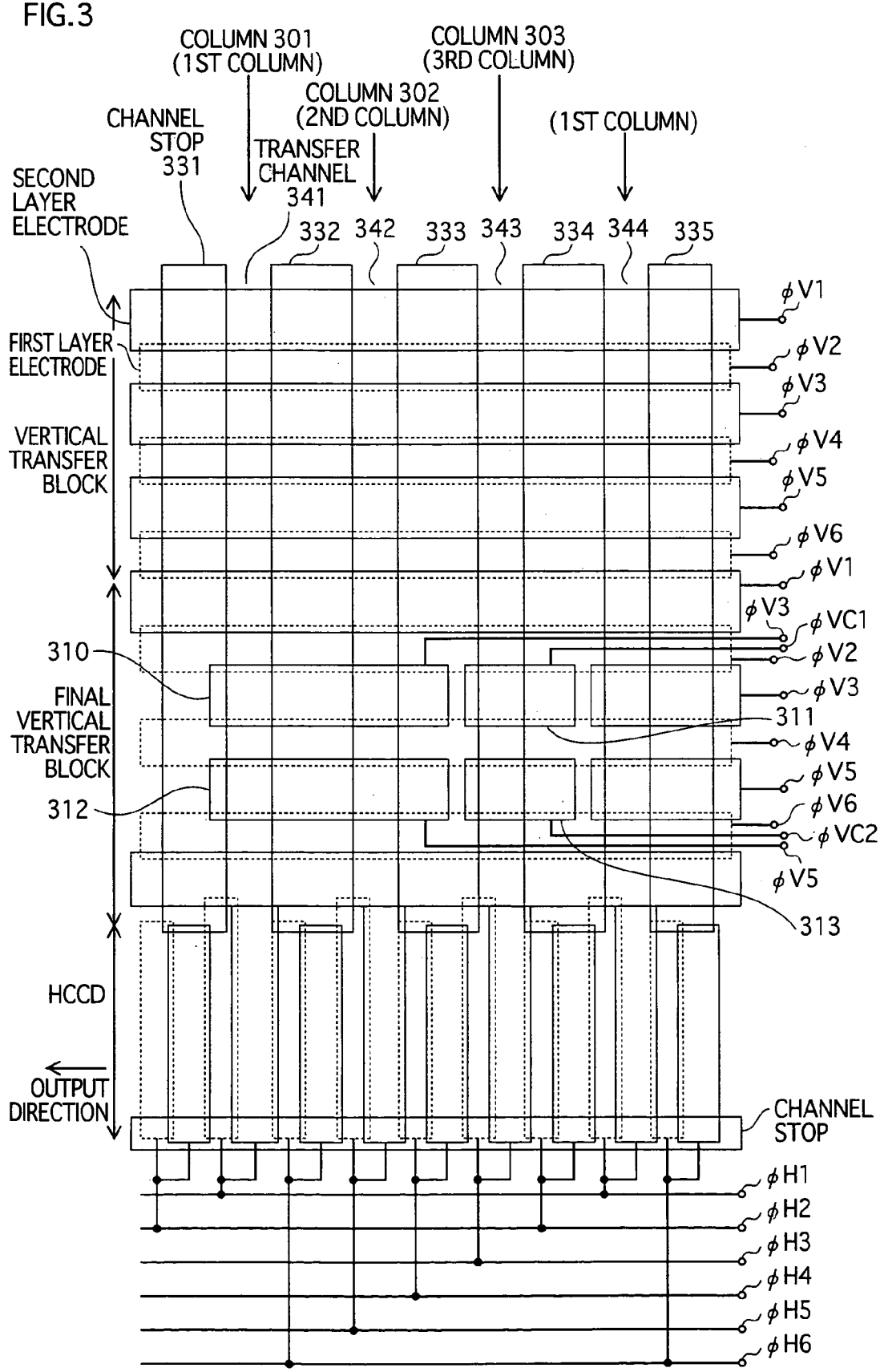
FIG. 3 illustrates an instance of a specific placement of gate electrodes in the solid-state image sensor 1.

FIG. 3 illustrates an instance of a specific placement of gate electrodes in the solid-state image sensor 1.

FIG. 3 shows a section corresponding to the final vertical transfer blocks and the vertical transfer blocks immediately preceding the final vertical transfer blocks shown in FIG. 1.

As shown in FIG. 3, there are channel stops 331-335 between which transfer channels 341-344 are provided. These transfer channels 341-344 correspond to vertical transfer units.

Compared to the other vertical transfer blocks, the final vertical transfer blocks in the 3rd columns of the vertical transfer groups have different configurations in their transfer electrodes.

In the final vertical transfer blocks of the 3rd columns, the second and fourth electrodes from the closest side of the horizontal transfer unit 4 are the fifth-phase and third-phase electrodes, respectively. Each of the third-phase and fifth-phase electrodes is set up as an independent electrode which is different from other shared electrodes. This is in order to make these third-phase and fifth-phase electrodes transfer their signal charges independently from other vertical transfer blocks and the final vertical transfer blocks in the other columns (i.e. the 1st and 2nd columns).

In Column 303 (the 3rd column), for example, the electrode 311 is independent from the electrode 310, which is a transfer electrode of both Columns 301 (the 1st column) and 302 (the 2nd column) and is controlled according to the control signal φV3. The electrode 311 is controlled according to the control signal φVC1.

In a similar fashion, the electrode 313 is independent from the electrode 312, which is a transfer electrode of both Columns 301 and 302 and is controlled according to the control signal φV5. The electrode 313 is controlled according to the control signal φVC2.

HCCD in FIG. 3 is the horizontal transfer unit and is controlled by the six-phase control signals φH1-φH6.

Figure 4:
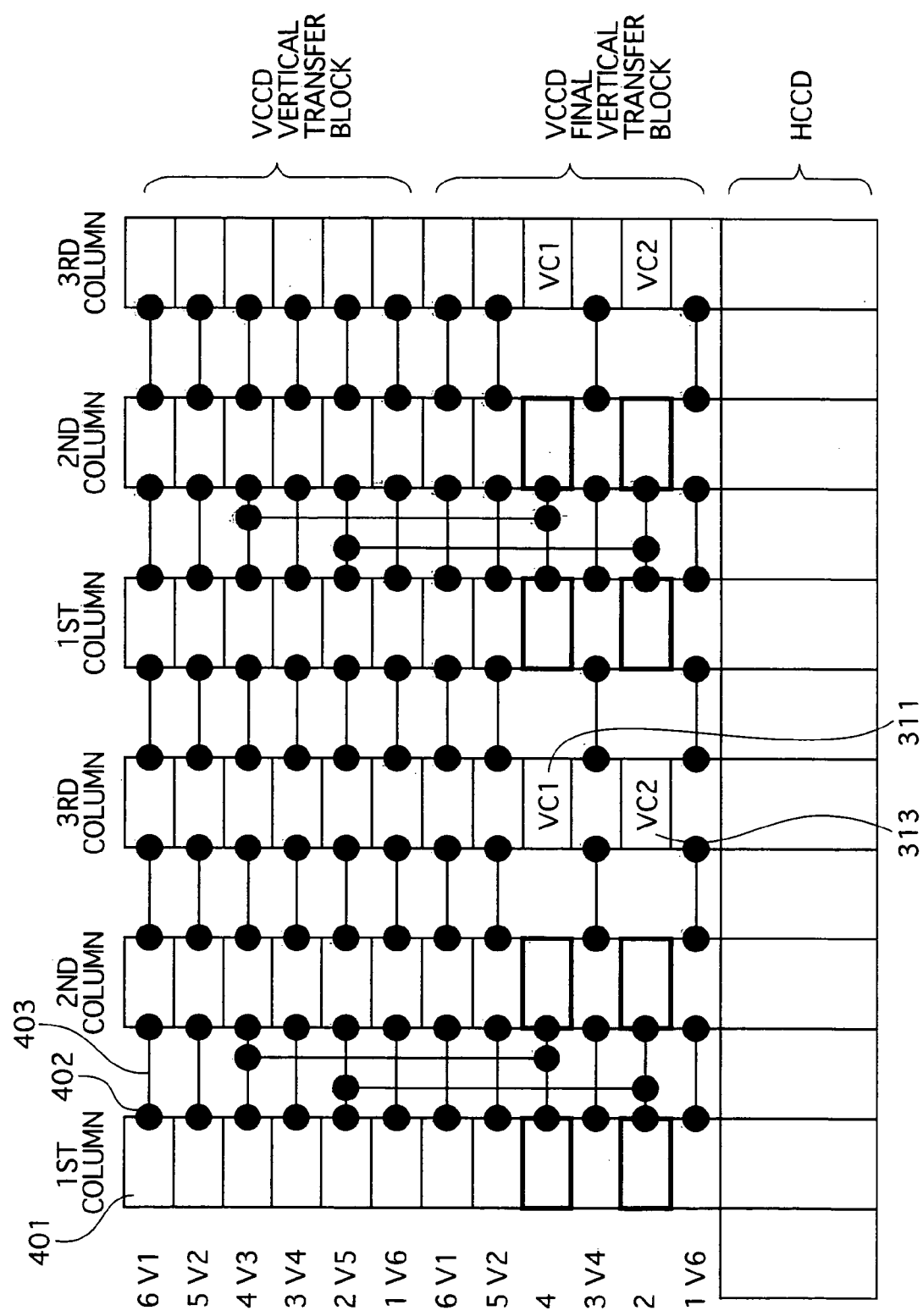
FIG. 4 is a pattern diagram of an electrode configuration.

FIG. 4 is a pattern diagram of an electrode configuration shown in FIG. 3.

In FIG. 4, each of the rectangles in the VCCD transfer blocks and the VCCD final transfer blocks represents an electrode (e.g. the electrode 401). Black circles indicate connection points (e.g. the connection point 402), while solid lines between these black circles indicate connection lines (e.g. the connection line 403). The same control signal is applied to electrodes connected via such connection points and connection lines.

In FIGS. 3 and 4, V1 denotes an electrode, and φV1 denotes a control signal applied to the electrode V1.

Similarly, V2-V6, VC1, and VC2 each denote electrodes, while φV2-φV6, φVC1, and φVC2 denote control signals applied to the corresponding electrodes.

In the vertical transfer blocks, of the vertical transfer unit 3, other than the final vertical transfer blocks, three transfer electrodes V2, V4, and V6 are each formed as shared electrodes using monolayered electrode membranes (first layer electrodes) and spanning across all columns of the vertical transfer units 3.

Similarly, each of three transfer electrodes V1, V3, and V5 is formed as a shared electrode using a monolayered electrode membrane (a second layer electrode) which is disposed over (i.e. on the upstream side) one of the first layer electrodes in the manner as shown in FIGS. 3 and 4.

The controller outputs, to the solid-state image sensor 1, the control signals φV1-φV6, φVC1, φVC2, and φH1-φH6 for transferring signal charges.

3. Operations

Figure 5A:
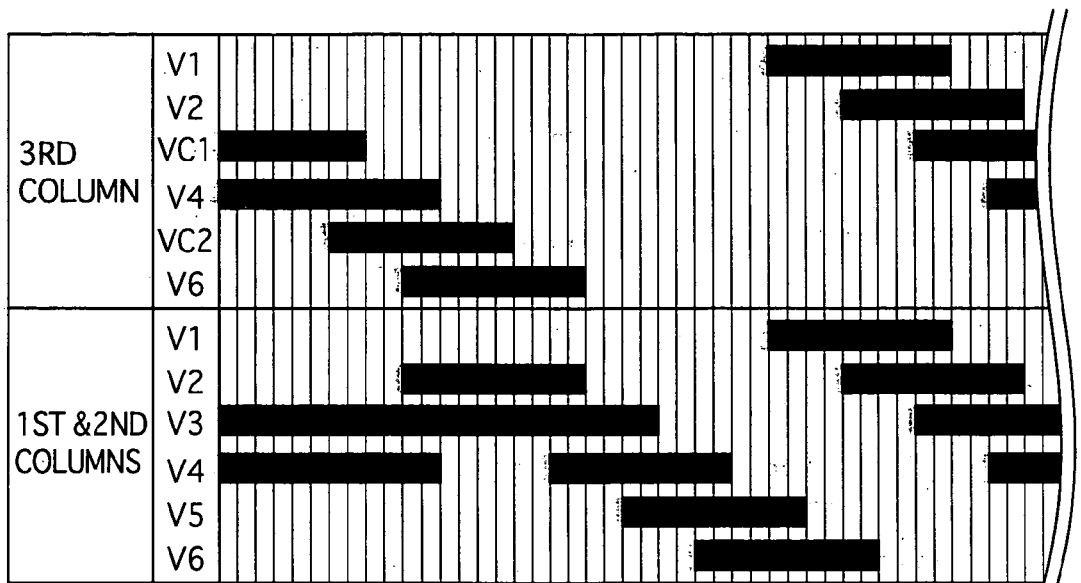
FIGS. 5A and 5B illustrate a timing chart for drive waveforms of control signals that the controller applies to the vertical transfer units 3 and horizontal transfer unit 4, and show the transfer operations of signal charges according to the timing chart.
Figure 5B:
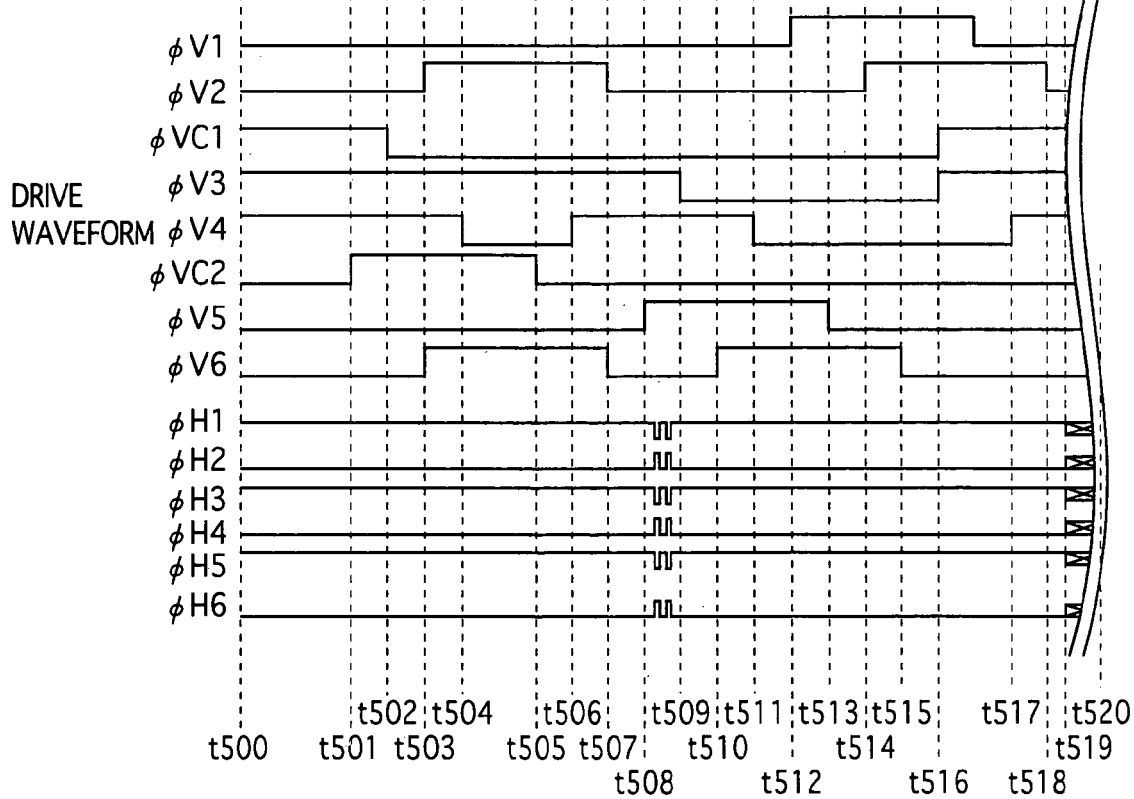

FIGS. 5A and 5B illustrate a timing chart for drive waveforms of control signals that the controller applies to the vertical and horizontal transfer units 3 and 4, and show the transfer operations of signal charges according to the timing chart.

FIGS. 6A and 6B are partially enlarged views of the drive waveforms of FIG. 5.

FIGS. 7-11 are state transition diagrams schematically showing transfer operations of the solid-state image sensor 1 under the control of the controller.

In conjunction with FIGS. 5-11, the following will describe transfer operations of the solid-state image sensor 1 when the drive waveforms are applied by the controller.

In the case where the electrodes have a configuration shown in FIG. 4, signal charges read out from the photoelectric converters 2 are stored in the electrodes V3 and V4 during time periods in which signal charges are horizontally transferred. These time periods are indicated by dotted lines in FIGS. 5A and 5B.

In FIG. 5, when drive pulses applied to each V1-V6 and VC1-VC2 are high levels, respective MOS capacitors under the relevant electrodes function as storage. On the other hand, when the drive pulses are low levels, the respective MOS capacitors function as barriers.

FIG. 5A is a pattern diagram showing whether signal charges are present or not under the respective electrodes of V1-V6 and VC1-VC2 located in the final vertical transfer blocks within the 1st to the 3rd columns of the vertical transfer units 3.

In FIG. 5A, a black bar indicates that signal charges are present under the relevant electrode.

Note here that the vertical transfer units 3 are arranged in a cycle of three columns as mentioned above. For the sake of convenience, the description here presents the operations of signal charge transfer regarding one set of three columns (the 1st, 2nd, and 3rd columns) as a representative example.

At timing t500, signal charges are present under VC1 and V4 of the 3rd column while signal charges are present under V3 and V4 in the 1st and 2nd columns.

In addition, between t500 and t508, φH1, φH3, and φH5 are respectively maintained at high levels.

First, the transfer operations of the signal charges in the 3rd column are described.

At t501, the controller sets φVC2, which is applied to VC2, to a high level. Hereby, in the 3rd column the signal charges become present across VC1, V4, and VC2.

At t502, the controller sets φVC1 to a low level. Hereby, the signal charges move to under V4 and VC2.

At t503, φVC6 is set to a high level and thereby the signal charges become present across V4, VC2, and V6, and H3 of HCCD.

At t504, φV4 is set to a low level and thereby the signal charges become present across VC2, V6, and H3.

At t505, φVC2 is set to a low level and thereby the signal charges become present under V6 and H3.

At t507, φV6 is set to a low level and thereby the signal charges move to H3 of HCCD.

Figure 7:
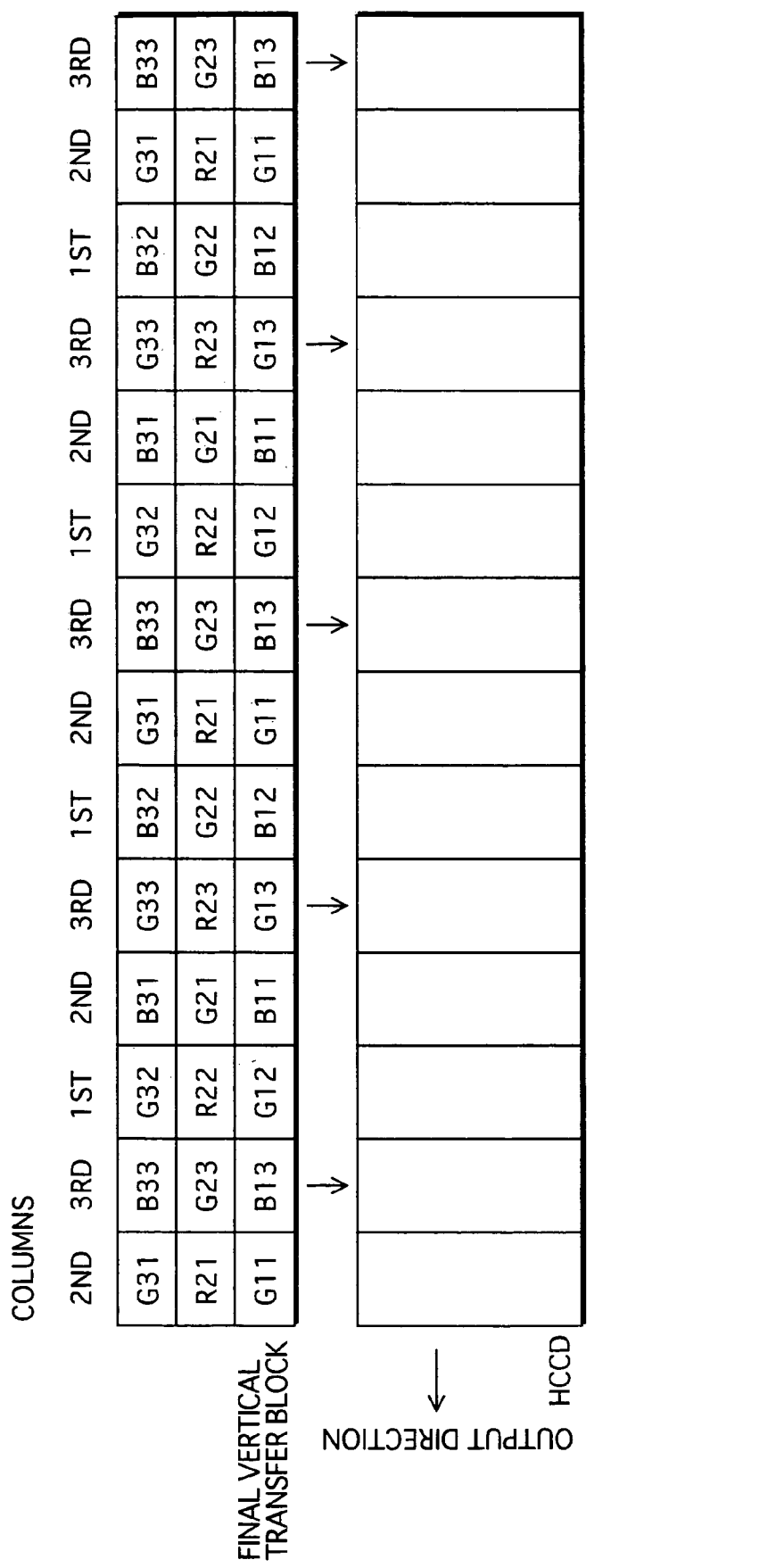
FIG. 7 is a state transition diagram schematically showing the transfer operation of the solid-state image sensor 1 under the control of the controller.

With this transfer operation at t507, among signal charges of the three pixels in the final vertical transfer block of the 3rd column, only signal charges stored in the pixel closest to the horizontal transfer unit 4 are transferred to the horizontal transfer unit 4. This transfer operation is shown in FIG. 7 with arrows. In the 3rd columns, signal charges of the pixels (B13 and G13) closest to HCCD are respectively transferred to HCCD.

FIG. 6B is a partially enlarged view of FIG. 5B, illustrating a timing chart for drive waveforms of the control signals φH1-φH6 and φR at a time between t508 and t509. t620-t624 each indicate timings.

Between t508 and t509, the controller outputs two-phase control signals for signal charge transfer.

At t620, the transferred signal charges of the 3rd column is present under H3.

At t621, φH4 is set to a high level, and thereby the signal charges under H3 move to under H4 between t621 and t622.

At t622, φH5 is set to a high level, and thereby the signal charges under H4 move to under H5 between t622 and t623.

At t623, φH6 is set to a high level, and thereby the signal charges under H5 move to under H6 between t623 and t624.

At t624, φH1 is set to a high level, and thereby the signal charges under H6 move to under H1 at t624 or later.

Figure 8:
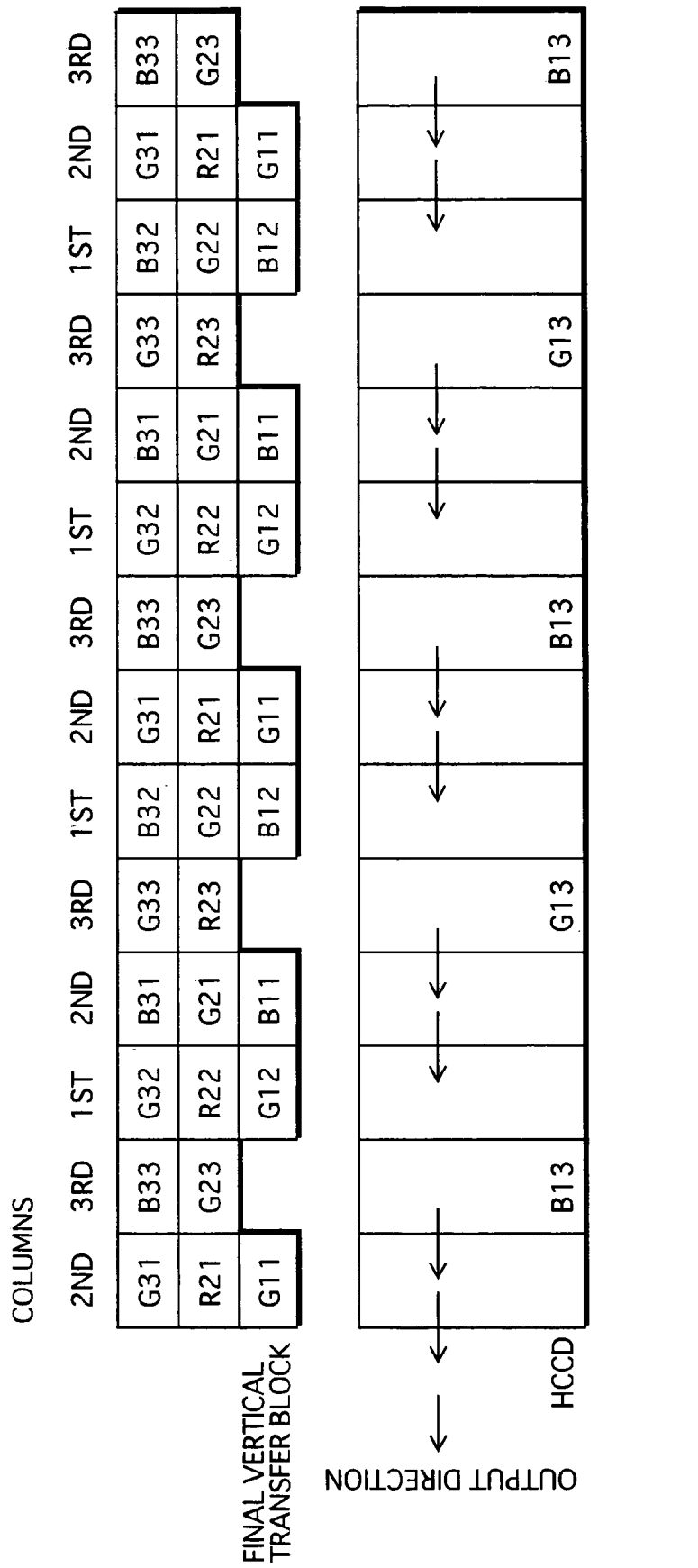
FIG. 8 is a state transition diagram schematically showing a transfer operation of the solid-state image sensor 1 under the control of the controller.

In the above manner, the signal charges (of B13, and of G13) in the horizontal transfer unit 4 are respectively transferred to positions corresponding to two pixels shifted in the output direction as shown in FIG. 8.

Next, the transfer operations of the signal charges in the 1st and 2nd columns are described. These operations as shown in the FIG. 5A can be explained in the same manner as in the case of the 3rd column cited above.

As shown in FIG. 5, φV2 is set to a high level at t503 before t504 at which φV4 is set to a low level.

Between t500 and t503, V3 and V4 store the signal charges. φV2 is set to a high level at t503 and thereby V2, V3, and V4 store the signal charges between t503 and t504. Between t504 and t505, V2 and V3 function as storage.

Thus, sequentially making predetermined electrodes store the signal charges prevents loss in the signal charges during which other signal charges are transferred from the vertical transfer blocks to the horizontal transfer unit 4. That is, even when the vertical transfer blocks are temporarily not transferring signal charges thereof, these signal charges are stored and not lost.

In both 1st and 2nd columns, the signal charges present under V3 and V4 at t500 are transferred to HCCD at t515 due to a control of the controller.

Figure 9:
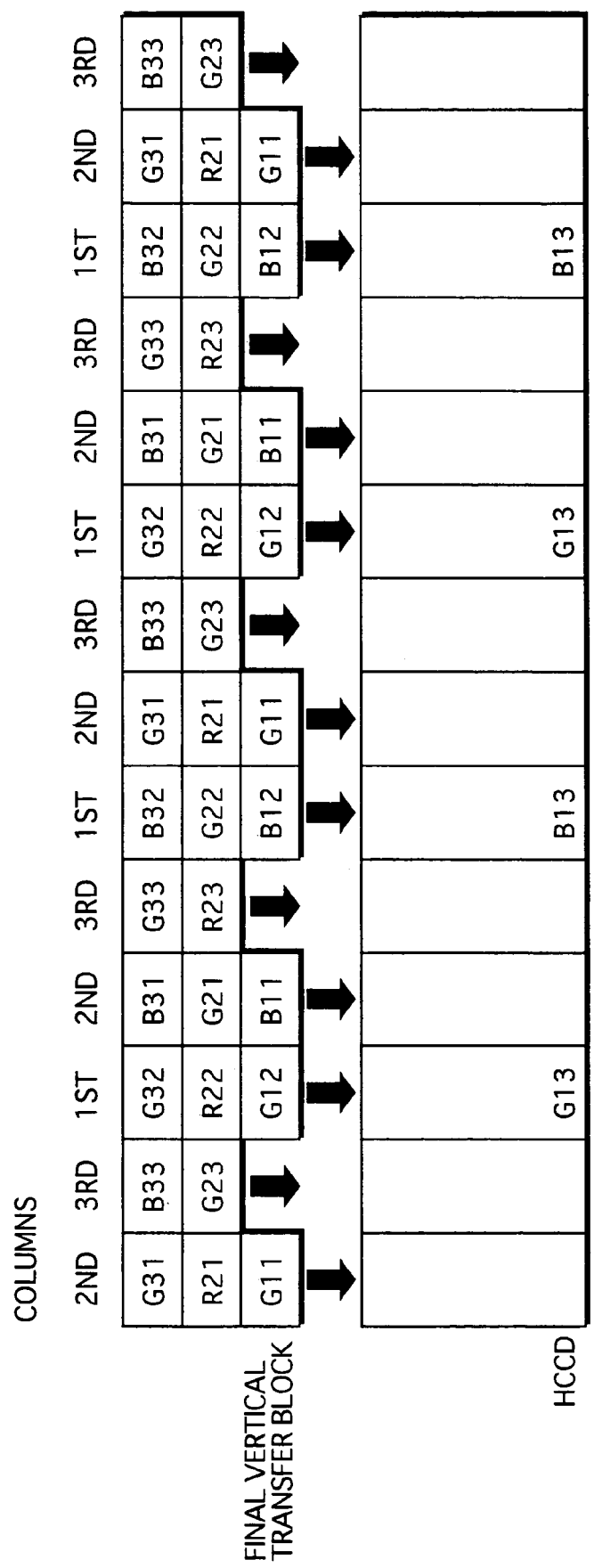
FIG. 9 is another state transition diagram schematically showing the transfer operation of the solid-state image sensor 1 under the control of the controller.

Between t509 and t519, the signal charges in the final vertical transfer blocks of the three columns are all transferred to positions corresponding to one row shifted to the downstream side as shown in FIG. 9, together with the signal charges of all the vertical transfer blocks (not shown) located in the upstream side from the respective final vertical transfer blocks. This transfer operation is shown in FIG. 9 with arrows. Within each of the 1st and 2nd columns, among signal charges of the three pixels in the final vertical transfer block, the signal charge of the pixel closest to the horizontal transfer unit 4 is transferred to the horizontal transfer unit 4.

Figure 10:
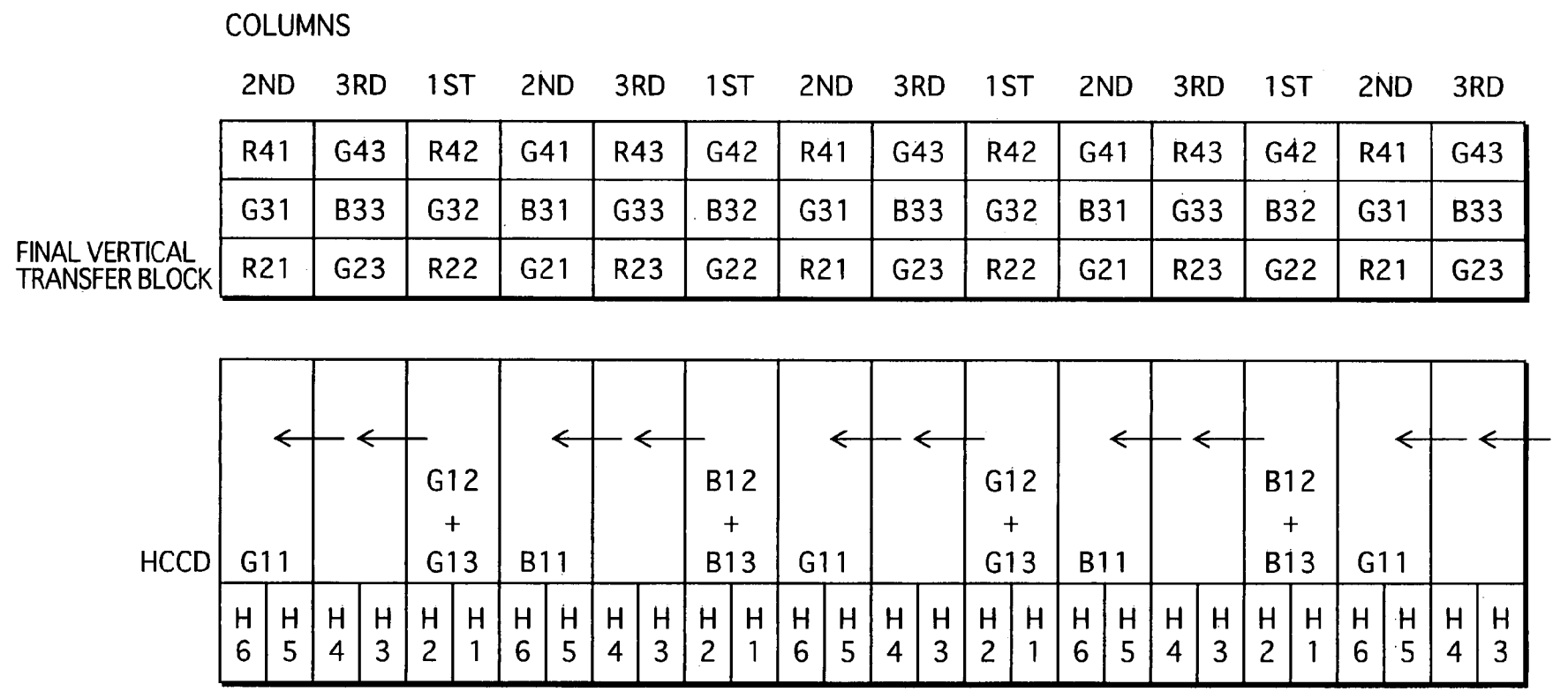

Herewith, the signal charges for each set of two pixels (G12+G13, and B12+B13) as shown in FIG. 10 are added together in the horizontal transfer unit 4, while the signal charges of G11 and B11 respectively are present alone in the horizontal transfer unit 4.

Then, between t519 and t520, the controller generates pulses shown in FIG. 6A, and thus by driving HCCD with six phases, the added signal charges of the two pixels are respectively transferred to locations corresponding to two pixels shifted in the output direction, as indicated by arrows in FIG. 10. On the other hand, the signal charges of G11 and B11 are not transferred, remaining under the same gates of HCCD. As a result, the signal charges for each set of three pixels (G11+G12+G13, and B11+B12+B13 respectively) are added together in the horizontal transfer unit 4 as shown in FIG. 11.

FIG. 6A is a timing chart showing drive waveforms of the control signals φH1-φH6 and φR at a time between t519 and t520.

At t601, the signal charges of the two-pixel sets shown in FIG. 10 have moved to under H1, and the signal charges of the single pixels (i.e. G11 and B11) have moved to under H5 as described above.

At t602, φH2 is set to a high level and thereby the signal charges of the two-pixel sets become present across H1, H2, and H3.

At t603, φH1 is set to a low level while φH4 is set to a high level, and thereby the signal charges of the respective two-pixel sets are added with the signal charges of the corresponding single pixels originally present under H5. Consequently, the signal charges of the three pixels are all added together and become present across H2, H3, H4 and H5.

At t604, φH2 is set to a low level and thereby the signal charges of the respective three-pixel sets become present across H3, H4, and H5.

At t605, φH3 is set to a low level while φH6 is set to a high level, and thereby the signal charges of the respective three-pixel sets become present across H4, H5 and H6.

At t605 or later, the control signals from the controller are outputted in a simple repeating pattern so that the electric charges in the horizontal transfer unit 4 are sequentially transferred in the output direction. These control signals are repeatedly input to the solid-state image sensor 1 from the controller until the output of signal charges (to be outputted) is completed.

As described above, for the respective two colors in the same row, the signal charges of three pixels of the same color found in every other pixel are added together. Resultantly, the number of pixels to be processed is reduced to one third in the horizontal direction.

Additionally, as shown in FIG. 11, the pixel-adding groups are evenly spaced apart from one another, alternating green and blue in the horizontal direction. As a result, moiré and aliased signals do not occur.

Subsequently, the solid-state image sensor 1 repeats the same transfer operations described above, and the signal charges for all pixels shown in FIGS. 2A and 2B are outputted one row at a time, sequentially from the closest row to the horizontal transfer unit 4.

As can be seen in the above operations, the solid-state image sensor 1 keeps the same orderly arrangement of pixels as of the original, after the number of pixels to be processed has been reduced to one third in the horizontal direction. Herewith, the deterioration in the image quality due to moiré and aliased signals is prevented. Additionally, the screen-update cycle of the video signals outputted from the solid-state image sensor 1 can be greatly improved without raising the clock frequency for the horizontal transfer.

Figure 12:
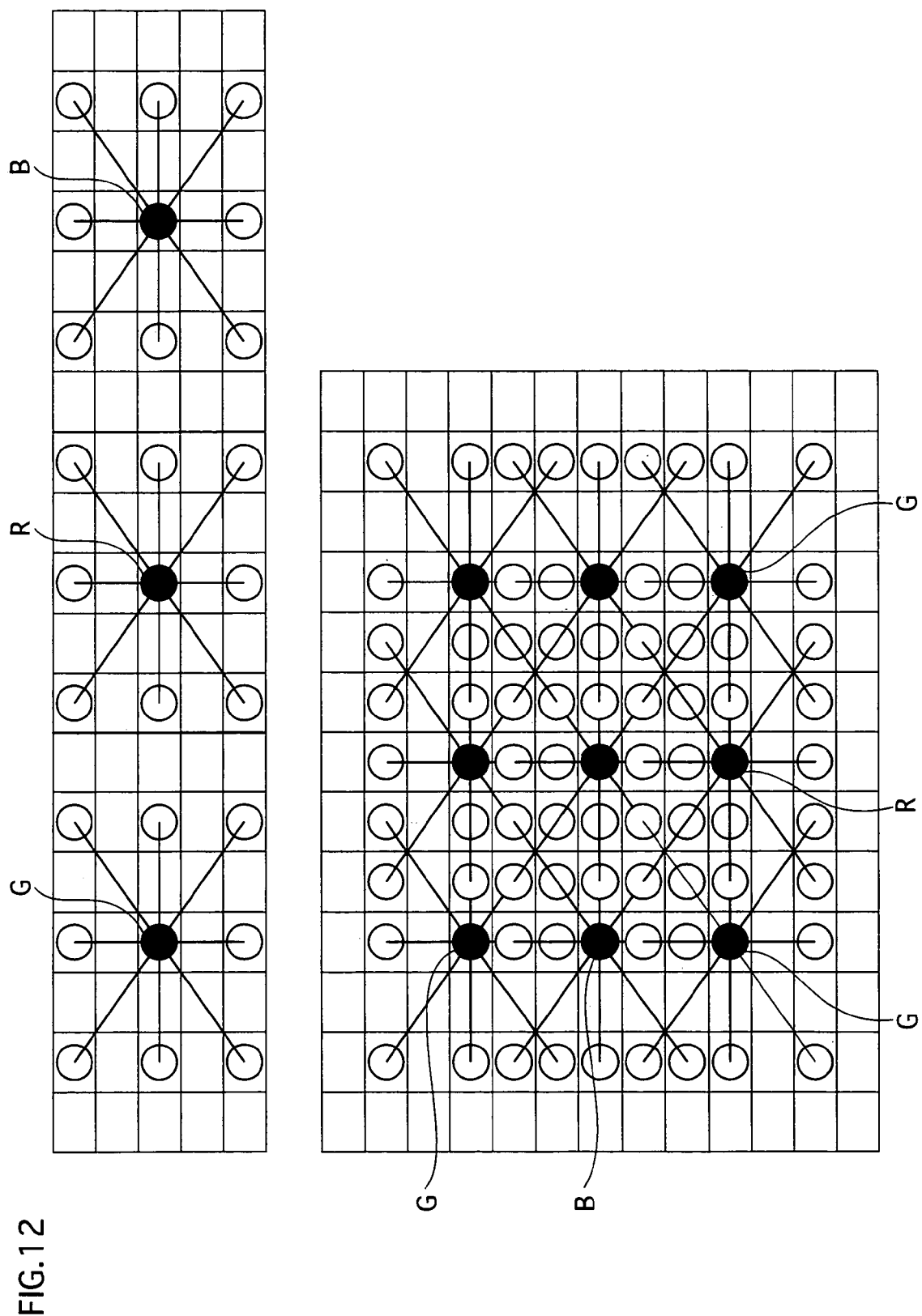
FIG. 12 exemplifies a pattern of pixel-adding groups according to an embodiment of a solid-state image sensor in accordance with the present invention.
Figure 13:
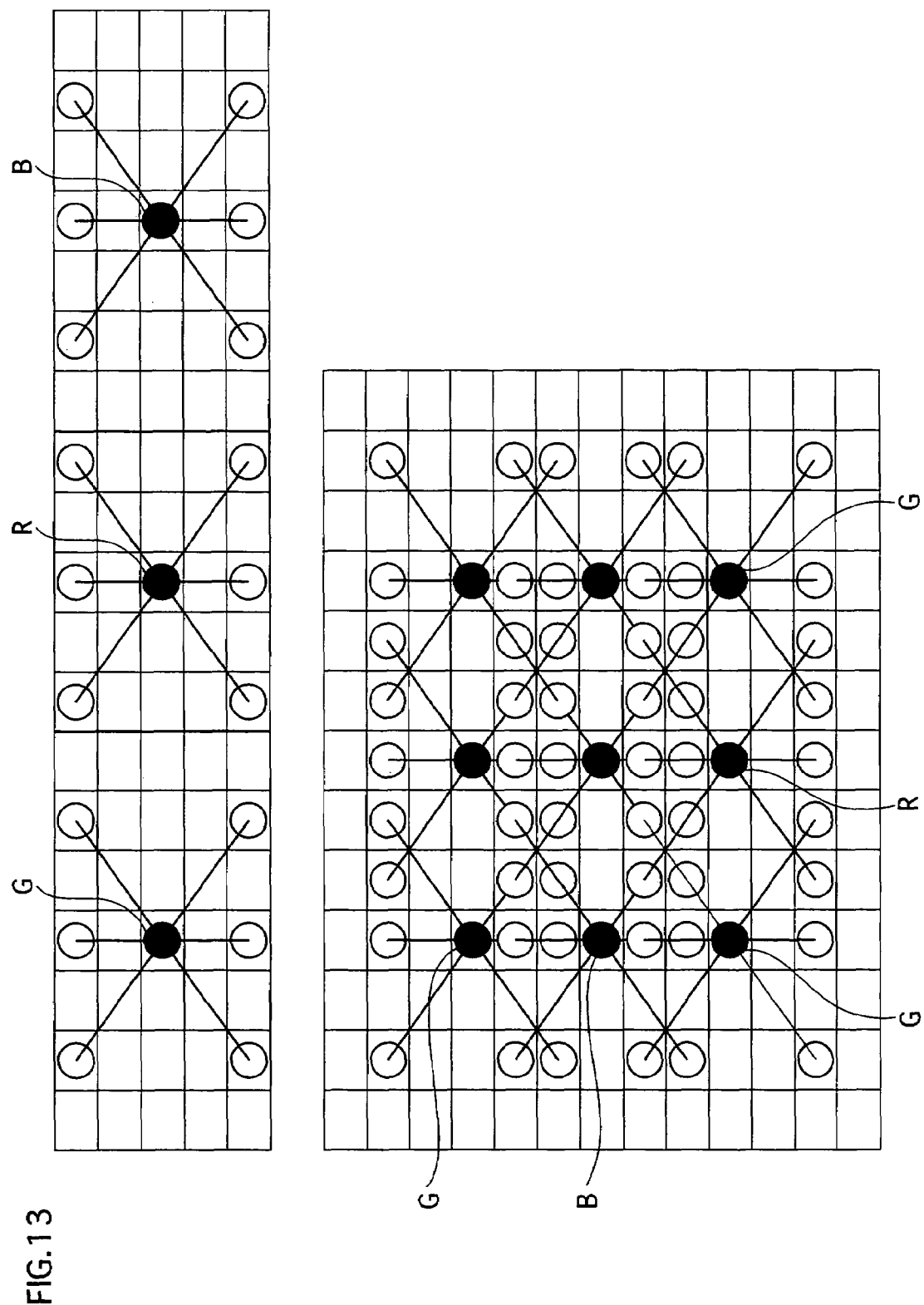
FIG. 13 exemplifies, another pattern of pixel-adding groups according to another embodiment of a solid-state image sensor in accordance with the present invention.
Figure 14:
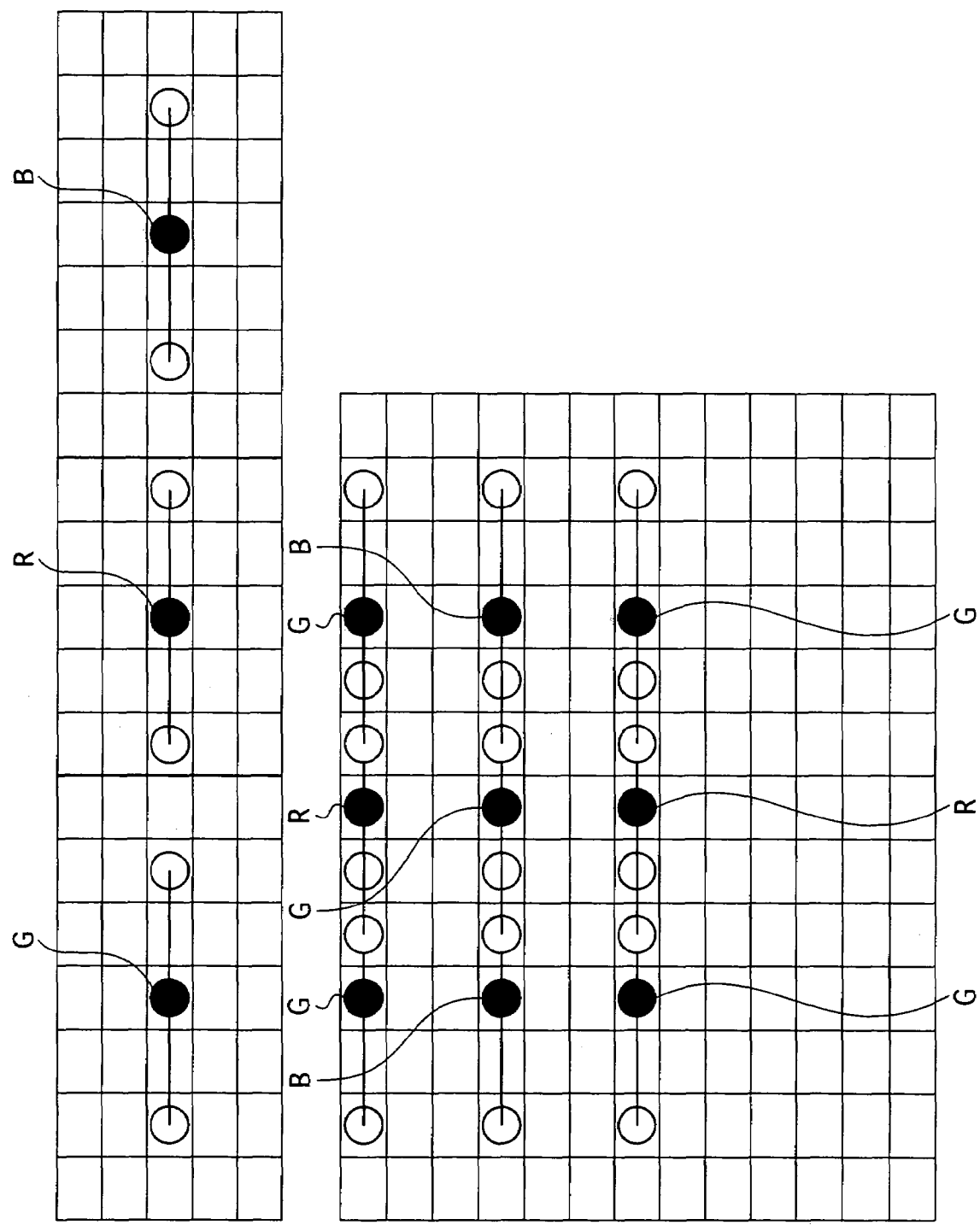
FIG. 14 exemplifies another pattern of pixel-adding groups according to another embodiment of a solid-state image sensor in accordance with the present invention.

FIGS. 12-14 each illustrate patterns of pixel-adding groups according to the embodiment of a solid-state image sensor in accordance with the present invention.

Nine pixels of the same color as shown in FIG. 12 make up one pixel-adding group. With this configuration, all photodiode pixels are used in the adding operations, without losing signal charges of any pixels. As a result, the light sensitivity of the solid-state image sensor can be improved.

In this case, the centers of pixel-adding groups of each R, G, and B are evenly spaced from one another as shown in FIG. 12.

This allows, therefore, for creating images with high resolution carrying less moiré.

Adding signal charges of three pixels of the same color found in every other pixel in the vertical direction is realized for example in the following manner.

(1) First, for each vertical transfer unit 3, a signal charge of one pixel is read out to the vertical transfer unit 3 every three rows. Then, each signal charge is vertically transferred to a position corresponding to two pixels shifted to the downstream side from the original position.

(2) Next, a signal charge of the second pixel to the downstream side from each of the pixels of (1) is read out to the same vertical transfer unit 3 and is added with the signal charge of the relevant pixel of (1). Then, these added signal charges are vertically transferred to a position corresponding to two pixels shifted to the downstream side.

(3) Similarly, a signal charge of the second pixel to the downstream side from each of the pixels of (2) is read out to the same vertical transfer unit 3 and is added with the relevant above added signal charges. In this manner, signal charges of three pixels of the same color, found in every other pixel, in the vertical direction are sequentially added together.

Note here that the above adding operations are feasible with a six-phase electrode configuration in which each vertical transfer block is made up of three pixels.

In the case of a four-phase electrode configuration in which each vertical transfer block is made up of two pixels, a total of eight-phase electrodes are required. This is because three such vertical transfer blocks totaling six pixels are incorporated into one, and all readout electrodes respectively corresponding to the six pixels need to be independent from one another.

As shown in FIG. 13, a pixel-adding group may be formed with, for example, six pixels in total by excluding the middle row from the pixel-adding group, made up of nine pixels, of FIG. 12.

In this case, the centers of pixel-adding groups of each R, G, and B are also evenly spaced from one another. As a result, an image with high resolution carrying less moiré can be obtained.

Furthermore, as shown in FIG. 14, a pixel-adding group may be created with only three pixels aligned in the horizontal direction by excluding two rows from the three rows in the pixel-adding group of FIG. 12.

By excluding rows in this way, the number of pixels to be processed is also reduced in the vertical direction. Consequently, the speed of the signal output can be further improved.

There is a method of reducing the number of pixels to be processed in the vertical direction. For instance, when signal charges are read out from photodiodes, each-forms a pixel, to the vertical transfer units 3, signal charges of unwanted rows are not read out. The signal charges of unwanted rows are left in the photodiodes, and thus the number of pixels to be processed can be reduced in the vertical direction by excluding pixels in rows that were not read out.

In this case, the unread signal charges can be drained to, for example, the substrate from the photodiodes.

Figure 15:
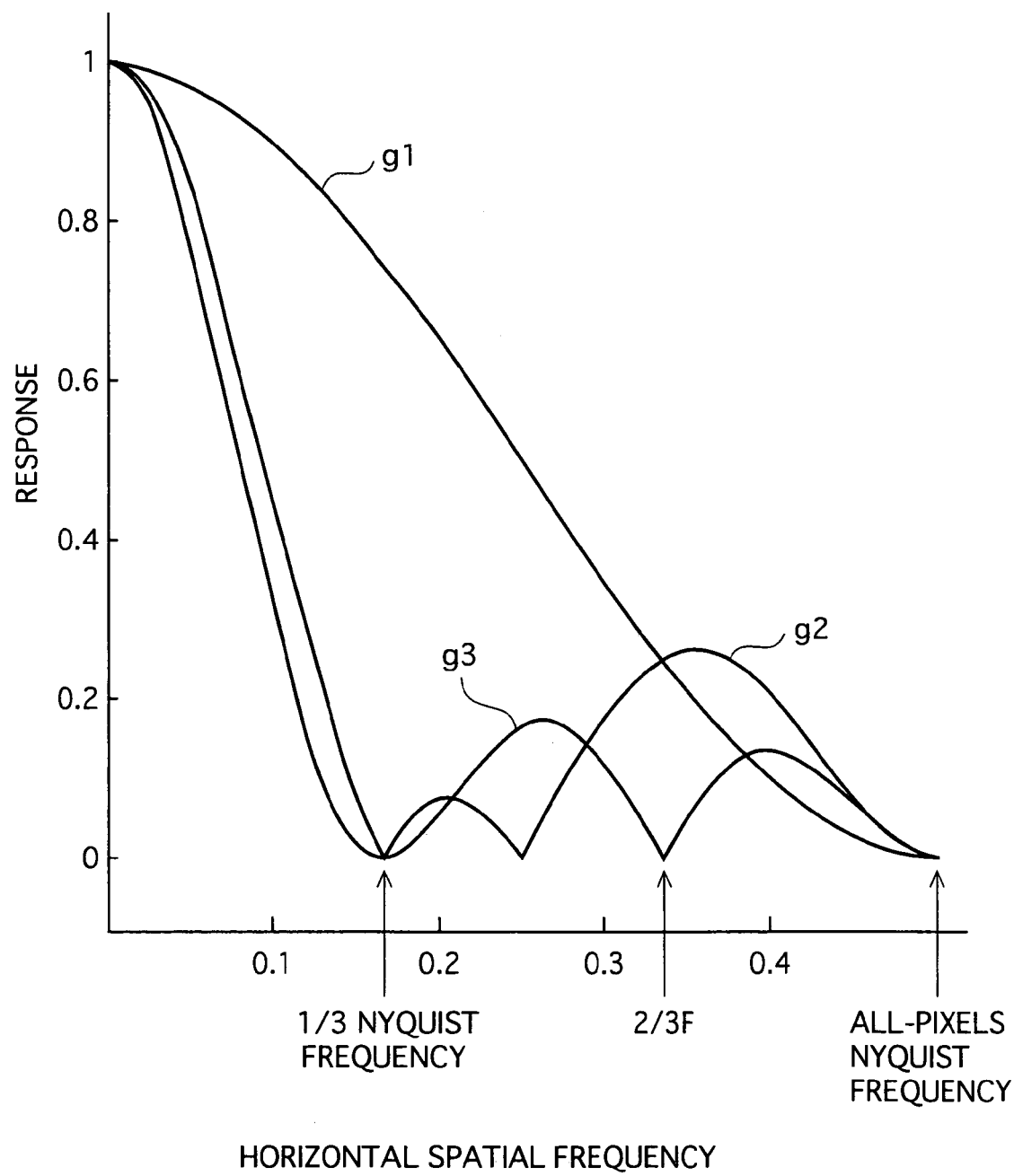
FIG. 15 is a graph showing horizontal spatial frequency responses.

FIG. 15 is a graph showing horizontal spatial frequency responses. In the figure, g1 denotes a frequency response of the all pixels when pixel addition is not performed.

The relationship between the all-pixel Nyquist frequency F and all-pixel sampling frequency f can be expressed as: $F = \frac{1}{2} \times f$.

When sampling is performed with one-third of the original sampling frequency due to excluding pixels to be processed, any component of the original signal that is above one-third of the Nyquist frequency ($\frac{1}{3}F$) folds back and therefore the component of $\frac{2}{3}F$ is added to the DC component.

In FIG. 15, g2 denotes a frequency response obtained when, among three pixels aligned horizontally next to each other, two pixels at ends are added as in the case of Patent Document 1 described above.

In this case, the Nyquist frequency becomes ⅓F. Since the component of ⅔F is approximately 0.25, this component is folded back to the DC component. As a result, aliased signals are generated.

In FIG. 15, g3 denotes a frequency response obtained when three pixels of the same color, found in every other pixel, are added together as in the case of the present invention.

In this case, the Nyquist frequency also becomes ⅓F. However, since the component of ⅔F is 0, the component folded back to the DC component is practically naught.

The solid-state image sensor 1 having characteristics shown in FIG. 15 can generate high-quality video signals carrying less moiré and/or reduced aliased signals.

The above embodiment described the configuration and the drive method for adding signal charges of three pixels in the horizontal direction. Note however that the present invention can be applied to signal charge addition of three or more odd-numbered pixels. The configuration and the drive method for adding signal charges of five or more pixels would be understood by one of ordinary skill in the art from the above embodiment.

In addition, the present invention is not limited to a solid-state image sensor having a filter array shown in FIG. 1, and can be applied to one having a different filter array.

Furthermore, the present invention is also applied to a monochromatic solid-state image sensor in which color filters are not used.

The application of the solid-state image sensor described in the above embodiment to a digital camera allows the digital camera to operate at high speed since the data is rapidly outputted from the solid-state image sensor as well as to achieve enhanced image quality. The high-speed operation mode according to the present invention is compatible with a normal mode for reading out all pixel information, and therefore this realizes a digital camera having a switching mode of operation between a moving-image mode (high-speed operation) and a still-image mode (all pixel readout operation).

Figure 16:
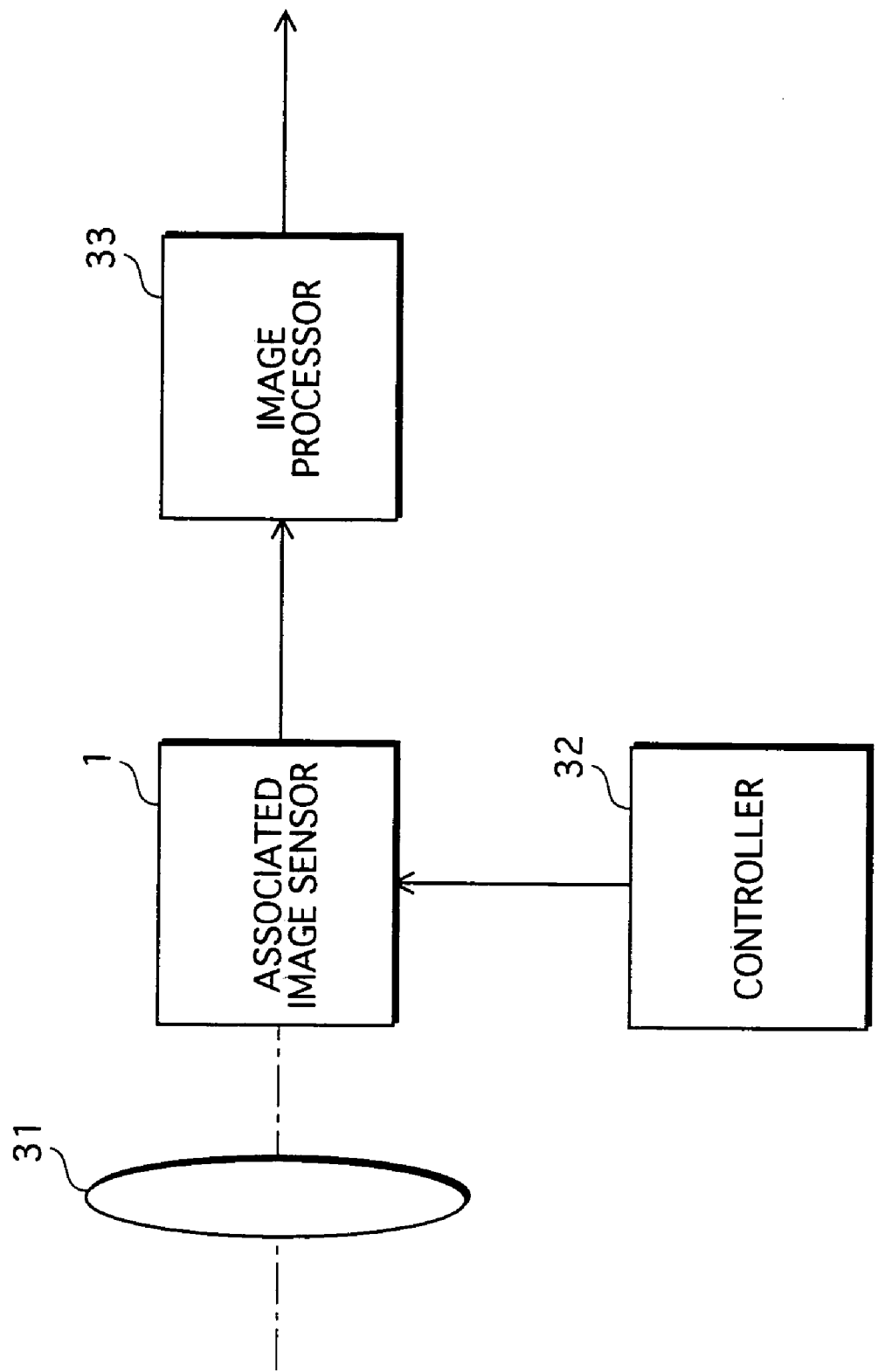
FIG. 16 illustrates a configuration example of a digital camera according to the present invention.

FIG. 16 illustrates a configuration example of a digital camera according to the present invention.

The digital camera comprises: an optical system 31 including for example a lens to focus the incident light from the subject onto an imaging area of the solid-state imaging sensor 1, a controller 32 for controlling the drive of the solid-state image sensor 1, and an image processor 33 for performing various signal processing on the signals outputted from the solid-state image sensor 1.

4. Modifications

The present invention has been described based on the above embodiment, however it is apparent that the present invention is not confined to the embodiment.

The present invention also includes the following cases.

[1] Although the above embodiment described the case in which the final vertical transfer blocks have the electrode configuration shown in FIG. 4, the electrode configuration can be different.

Figure 17:
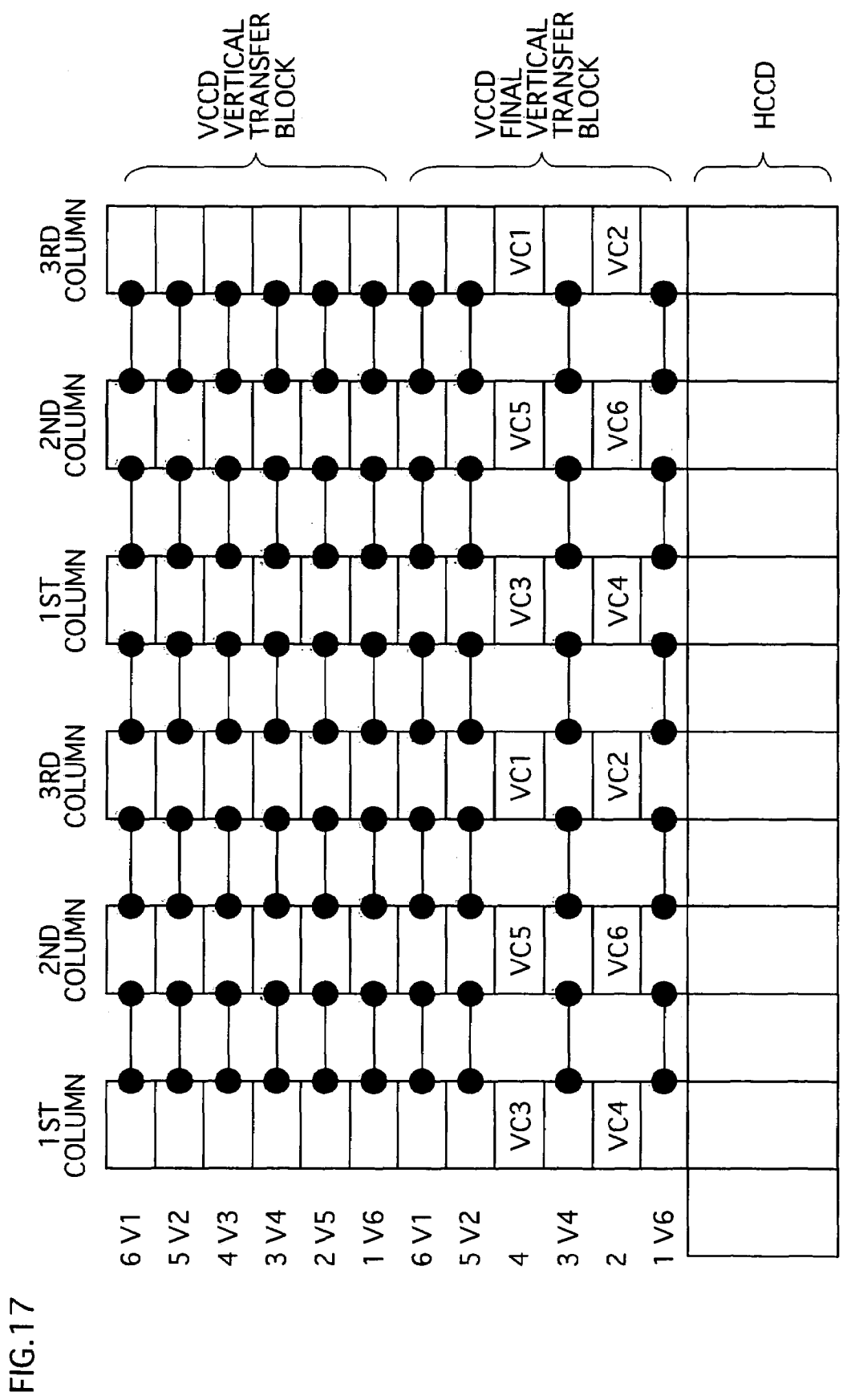
FIG. 17 is a pattern diagram illustrating a gate configuration of vertical transfer blocks in the solid-state image sensor 1 according to an embodiment of the present invention.
Figure 18:
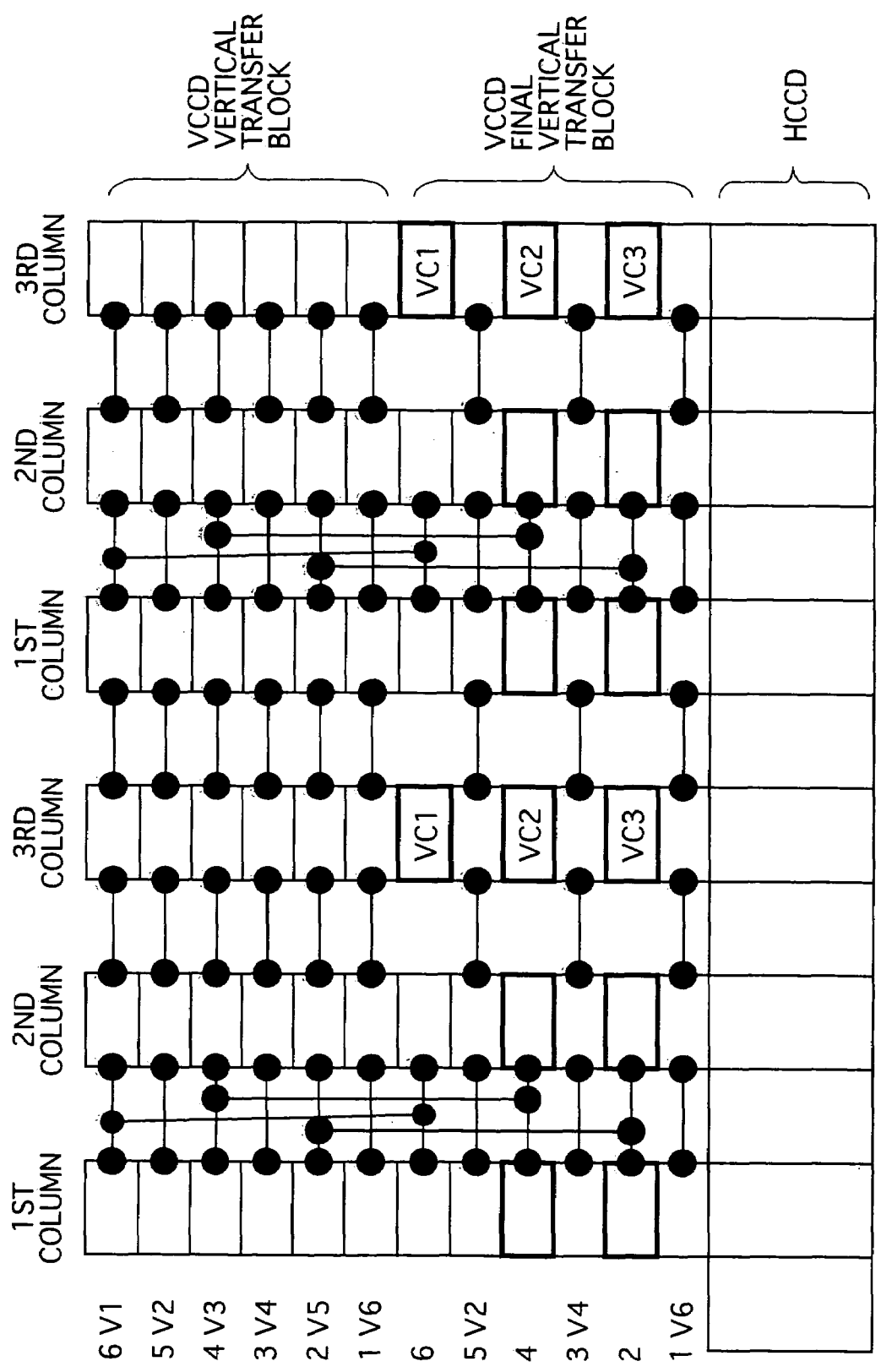
FIG. 18 is a pattern diagram illustrating another gate configuration of vertical transfer blocks in the solid-state image sensor 1 according to an embodiment of the present invention.
Figure 19:
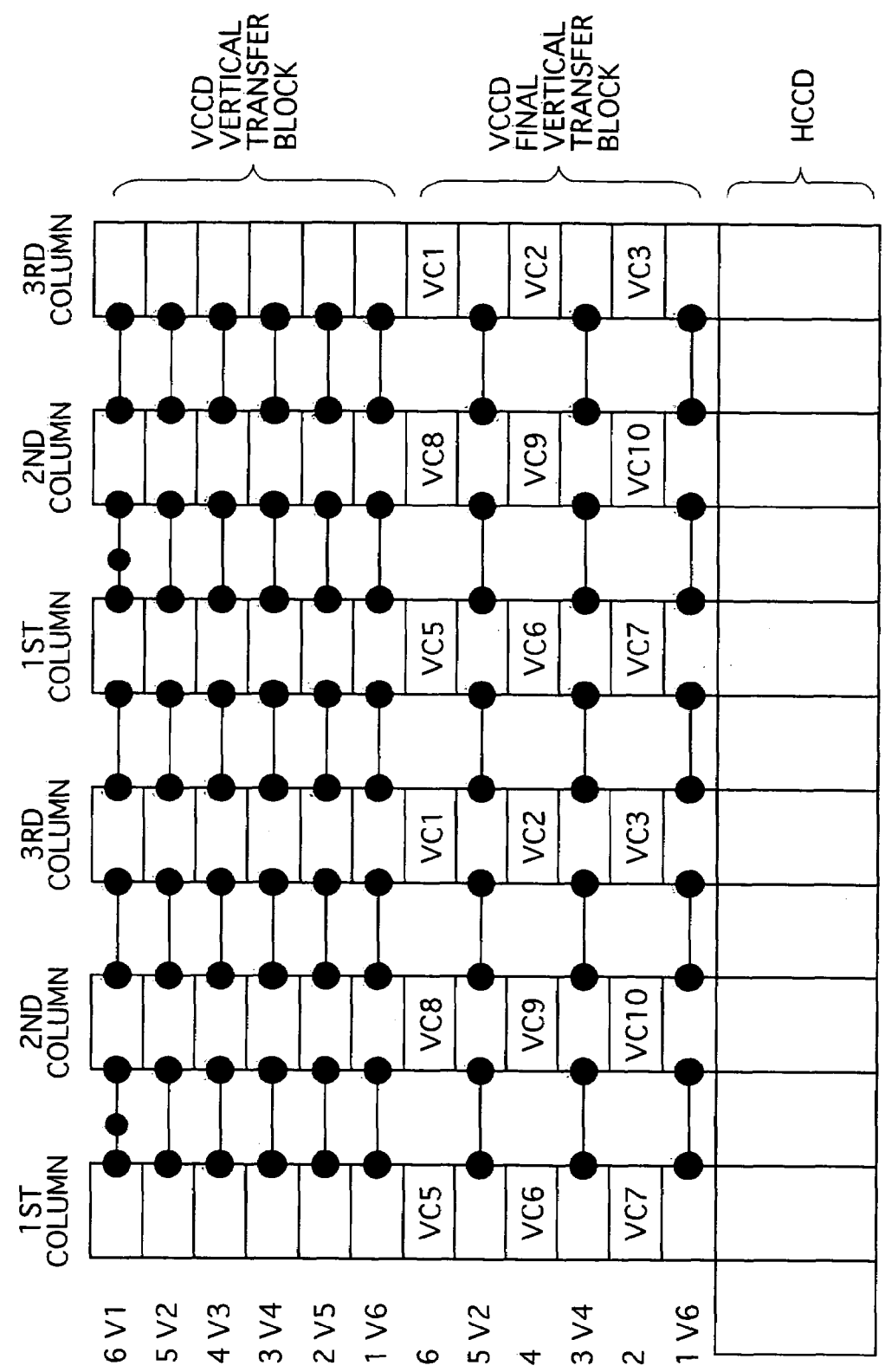
FIG. 19 is a pattern diagram illustrating a gate configuration of vertical transfer blocks in the solid-state image sensor 1 according to an embodiment of the present invention.

FIGS. 17-19 are pattern diagrams respectively illustrating gate configurations of the vertical transfer blocks in the solid-state image sensor 1 according to the embodiment of the present invention.

The electrode configuration shown in FIG. 4 may be, for instance, modified by using independent electrodes for the third-phase and the fifth-phase electrodes in the final vertical transfer blocks of the 1st and 2nd columns. As shown in FIG. 17, in the 1st columns the third-phase and the fifth-phase electrodes are VC3 and VC4, respectively. Similarly, in the 2nd columns the third-phase and the fifth-phase electrodes are VC5 and VC6, respectively.

In the above embodiment, all the vertical transfer units 3 simultaneously perform the transfer operations as illustrated in FIG. 9. However, with the electrode configuration of FIG. 17, the transfer operation may be performed as follows. First, only the 1st and 2nd columns perform the transfer operations. Then, all vertical transfer blocks transfer the signal charges to positions corresponding to one row shifted to the downstream side.

In the case when the vertical transfer units 3 are driven with six phases, among six electrodes of the final vertical transfer blocks in the respective 3rd columns (or all the 1st to 3rd columns), preferably two or three are independent electrodes.

In addition, the electrode configuration shown in FIG. 4 may be modified to ones illustrated in FIG. 18 and FIG. 19 where the three transfer electrodes in the predetermined final vertical transfer blocks are independent electrodes.

These two or three independent electrodes can be situated adjacent to each other. From the aspect of the manufacturing processes, however, preferably at least one shared electrode lies between any two independent electrodes.

Therefore, in the case when the vertical transfer units 3 are driven with six phases, it is desirable to make the second and fourth electrodes from the closest side of the horizontal transfer unit 4 independent, as shown in FIG. 4 and FIG. 17. Alternatively, with the electrode configurations of FIG. 18 and FIG. 19, it is preferable to make the second, fourth and sixth electrodes from the closest side of the horizontal transfer unit 4 independent.

The present embodiment exemplified the electrode configuration with six-phase drive, however, three-phase or four-phase electrodes can be used instead.

Note that two independent electrodes are required when three-phase or four-phase electrodes are used.

[2] The above embodiment described the case in which a vertical transfer group comprises three vertical transfer units 3, one of which has independent electrodes. Here what is required is, however, to meet the following conditions: the number of vertical transfer units included in one vertical transfer group is 2n+1 (n: an integer of 1 or more) and, among the 2n+1 vertical transfer units, n or more vertical transfer units have independent electrodes.

In other words, when three vertical transfer units make up one vertical transfer group, it is necessary that one or more out of the three vertical transfer units have independent electrodes. Similarly, in the case of five vertical transfer units making up one vertical transfer group, two or more out of the five vertical transfer units need to have independent electrodes. Likewise, in the case of seven, three or more out of the seven need to have independent electrodes. In the case of nine, four or more out of the nine need to have independent electrodes, and so forth.

[3] The above embodiment described the case in which, within the final vertical transfer blocks in the 3rd columns, the second and fourth electrodes from the horizontal transfer unit are independent electrodes. However, the third and fifth electrodes from the horizontal transfer unit may be independent transfer electrodes instead.

The above embodiment has adopted the electrode configuration with the minimum number of independent electrodes from the standpoint of ease of manufacturing solid-state image sensors as well as simplification of the electrode-wiring pattern, however, the number of independent electrodes can be increased.

[4] The present invention includes a method of accomplishing the above described solid-state image sensors. This may be a computer program which is executed by a computer, or may be digital signals representing the computer program.

The present invention may be a computer-readable storage medium, such as a flexible disk, a hard disk, a CD-ROM (Compact Disc Read Only Memory), MO (Magneto-Optical) disc, a DVD (Digital Versatile Disc), a DVD-ROM (Digital Versatile Disc Read Only Memory), a DVD-RAM (Digital Versatile Disc Random Access Memory), a BD (Blu-ray Disc), or a semiconductor memory, on which the above-mentioned computer program or digital signals are recorded. The present invention may also be the computer program or the digital signals recorded on such a storage medium.

The present invention may also be the computer program or digital signals to be transmitted via networks, as represented by telecommunications, wire/wireless communications, and the Internet.

The present invention may also be a computer system having a microprocessor and a memory, wherein the memory stores the computer program, and the microprocessor operates according to the computer program.

The computer program or digital signals may be stored into the above storage medium and transferred to an independent computer system, or alternatively, may be transferred to an independent computer system via the above network. Then, the independent computer system may execute the computer program or digital signals.

[5] The present invention may be accomplished by a combination of two or more of the above embodiment and modifications.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A solid-state image sensor which generates charge according to an amount of light received and outputs the generated charge, comprising:
    a plurality of photoelectric converters arranged in a matrix with rows and columns, each of the photoelectric converters operable to generate charge according to an amount of light received;
    a plurality of vertical transfer units, each of which is disposed along each column of the photoelectric converters and includes (a) a plurality of transfer electrodes and (b) charge storage units corresponding one-to-one with the transfer electrodes, each of the charge storage units operable to store the generated charge therein and transfer the stored charge to an adjacent charge storage unit according to a voltage applied to the corresponding transfer electrode; and
    a horizontal transfer unit disposed in a direction of the rows along an end side of the vertical transfer units in a charge transfer direction,
    wherein every 2n+1 vertical transfer units aligned next to each other in the row direction are incorporated into one vertical transfer group, where n is an integer of 1 or more, and, in n out of the 2n+1 vertical transfer units within each vertical transfer group, one or more predetermined transfer electrodes disposed close to the horizontal transfer unit are independent transfer electrodes unconnected with other transfer electrodes of the vertical transfer group, and
    wherein within the vertical transfer group, the transfer electrodes except the independent transfer electrodes are connected transfer electrodes connected with other transfer electrodes of the vertical transfer group, the connected transfer electrodes being applied with an in-phase voltage.

2. The solid-state image sensor of claim 1, wherein n is 1, in one out of three vertical transfer units within each vertical transfer group, one or more predetermined transfer electrodes disposed close to the horizontal transfer unit are the independent transfer electrodes.

3. The solid-state image sensor of claim 2, wherein in one out of the three vertical transfer units within the vertical transfer group, the independent transfer electrodes are at least a second and a fourth transfer electrodes from the horizontal transfer unit.

4. The solid-state image sensor of claim 2, wherein in one out of the three vertical transfer units within the vertical transfer group, the independent transfer electrodes are at least a third and a fifth transfer electrodes from the horizontal transfer unit.

5. The solid-state image sensor of claim 1, wherein a plurality of color filters, each of which is disposed over one of the photoelectric converters, are arranged in a cyclic pattern of two rows by two columns of the photoelectric converters.

6. The solid-state image sensor of claim 5, wherein in each cyclic pattern of four photoelectric converters, two color filters in a diagonal line have a first color, and remaining two color filters have a second and a third colors respectively.

7. A camera having the solid-state image sensor as recited in one of claims 1 to 6.

8. A solid-state image sensing apparatus, comprising:
    a solid-state image sensor including,
    a plurality of photoelectric converters which are arranged in a matrix with rows and columns and operable to generate charges according to an amount of light received,
    a plurality of vertical transfer units, each of which is disposed along each column of the photoelectric converters and includes (a) a plurality of vertical transfer electrodes and (b) vertical charge storage units corresponding one-to-one with the vertical transfer electrodes, and
    a horizontal transfer unit which is disposed in a direction of the rows along an end side of the vertical transfer units in a charge transfer direction and includes (a) horizontal transfer electrodes, two of which are disposed in the direction of the rows with respect to each of the vertical transfer units and (b) horizontal charge storage units corresponding one-to-one with the horizontal transfer electrodes,
    wherein the vertical and horizontal charge storage units are operable to store the generated charges therein and transfer the stored charges to adjacent charge storage units according to voltages applied to the corresponding transfer electrodes, and
    every 2n+1 vertical transfer units aligned next to each other in the row direction are incorporated into one vertical transfer group, where n is an integer of 1 or more, and, in n out of the 2n+1 vertical transfer units within each vertical transfer group, one or more predetermined transfer electrodes disposed close to the horizontal transfer unit are independent transfer electrodes unconnected with other transfer electrodes of the vertical transfer group; and a controller operable to systematically apply control voltages to the vertical and horizontal transfer electrodes so as to execute charge transfer operations in a predetermined order of (i) to (iv), (i) among charges stored within the n vertical transfer units disposed, in the vertical transfer group, on an opposite side from a predetermined direction of outputting the charges, charges stored in the vertical charge storage units located closest to the horizontal transfer unit are vertically transferred to the horizontal transfer unit, (ii) the transferred charges of the operation (i) are horizontally transferred to a position shifted in the predetermined direction of outputting the charges by one of 2n, 2n+1, and 2n+2 rows, (iii) among charges stored within the vertical transfer units except the n vertical transfer units, charges stored in the vertical charge storage units located closest to the horizontal transfer unit are vertically transferred to the horizontal transfer unit, and (iv) the transferred charges of the operations (ii) and (iii) are horizontally transferred in a 4n+2 phase-mode, and wherein within the vertical transfer group, the transfer electrodes except the independent transfer electrodes are connected transfer electrodes connected with other transfer electrodes of the vertical transfer group, the connected transfer electrodes being applied with an in-phase voltage.

9. The solid-state image sensing apparatus of claim 8, wherein within the vertical transfer group, the transfer electrodes except the independent transfer electrodes are connected transfer electrodes connected with other transfer electrodes of the vertical transfer group, the connected transfer electrodes being applied with an in-phase voltage.

10. The solid-state image sensing apparatus of claim 8, wherein the controller further applies the control voltages to the vertical transfer electrodes so as to add charges generated by 2 m+1 photoelectric converters each of which placed in every other photoelectric converter in the direction of the columns, where m is an integer of 1 or more.

11. The solid-state image sensing apparatus of claim 8, wherein
n is 1,
in one out of three vertical transfer units within each vertical transfer group, one or more predetermined vertical transfer electrodes disposed close to the horizontal transfer unit are the independent transfer electrodes,
the charge transfer operations comprises:

(i) among charges stored within the one vertical transfer unit disposed, within the vertical transfer group, on the opposite side from the predetermined direction, charges stored in the vertical charge storage unit located closest to the horizontal transfer unit are vertically transferred to the horizontal transfer unit;

(ii) the transferred charges of the operation (i) are horizontally transferred to a position, corresponding to one of 2, 3, and 4 rows of the photoelectric converters, shifted in the predetermined direction of outputting the charges;

(iii) among charges stored within remaining two vertical transfer units, charges stored in the vertical charge storage units located closest to the horizontal transfer unit are vertically transferred to the horizontal transfer unit; and (iv) the transferred charges of the operations (ii) and (iii) are horizontally transferred in a six phase-mode.

12. The solid-state image sensing apparatus of claim 8, wherein the controller further applies the control voltages to the vertical transfer electrodes so as to (a) add charges together generated by three photoelectric converters each of which placed in every other photoelectric converter in the direction of the columns, and (b) vertically transfer the added charges.

13. The solid-state image sensing apparatus of claim 8, wherein the controller further applies the control voltages to the vertical transfer electrodes so as to (a) discard, among charges generated by three photoelectric converters each of which placed in every other photoelectric converter in the direction of the columns, a charge generated by a middle photoelectric converter of the three, (b) add charges generated by remaining two photoelectric converters, and (c) vertically transfer the added charges.

14. The solid-state image sensing apparatus of claim 8, wherein the controller further applies the control voltages to the vertical transfer electrodes so as to (a) discard, among charges generated by three photoelectric converters each of which placed in every other photoelectric converter in the direction of the columns, charges generated by photoelectric converters at both ends of the three, and (b) vertically transfer a remaining charge generated by a middle photoelectric converter.

15. The solid-state image sensing apparatus of claim 8, wherein a plurality of color filters, each of which is disposed over one of the photoelectric converters, are arranged in a cyclic pattern of two rows by two columns of the photoelectric converters.

16. The solid-state image sensing apparatus of claim 15, wherein in the cyclic pattern, two color filters in a diagonal line have a first color, and remaining two color filters have a second and a third colors respectively.

17. The solid-state image sensing apparatus of claim 8, wherein a plurality of color filters, each of which is disposed over one of the photoelectric converters, are arranged in a cyclic pattern of two rows by four columns of the photoelectric converters, and two adjacent photoelectric converters each are incorporated into a cyclic patter of single blocks, the controller further applies the control voltages to the vertical transfer electrodes so as to add charges with respect to each of the single blocks.

18. A camera having the solid-state image sensing apparatus as recited in one of claims 8 to 17.

19. A charge transfer method executed by a controller for controlling a solid-state image sensor that includes (a) a plurality of photoelectric converters which are arranged in a matrix with rows and columns and operable to generate charges according to an amount of light received, (b) a plurality of vertical transfer units, each of which is disposed along each column of the photoelectric converters and includes a plurality of vertical transfer electrodes and vertical charge storage units corresponding one-to-one with the vertical transfer electrodes, and (c) a horizontal transfer unit which is disposed in a direction of the rows along an end side of the vertical transfer units in a charge transfer direction and includes horizontal transfer electrodes, two of which are disposed in the direction of the rows with respect to each of the vertical transfer units and horizontal charge storage units corresponding one-to-one with the horizontal transfer electrodes, the vertical and horizontal charge storage units being operable to store the generated charges therein and transfer the stored charges to adjacent charge storage units according to voltages applied to the corresponding transfer electrodes, and every 2n+1 vertical transfer units aligned next to each other in the row direction being incorporated into one vertical transfer group, where n is an integer of 1 or more, and, in n out of the 2n+1 vertical transfer units within each vertical transfer group, one or more predetermined transfer electrodes disposed close to the horizontal transfer unit being independent transfer electrodes unconnected with other transfer electrodes of the vertical transfer group, the controller systematically applying control voltages to the vertical and horizontal transfer electrodes, the charge transfer method comprising the steps of:
- (i) among charges stored within the n vertical transfer units disposed, in the vertical transfer group, on an opposite side from a predetermined direction of outputting the charges, charges stored in the vertical charge storage units located closest to the horizontal transfer unit are vertically transferred to the horizontal transfer unit;
- (ii) the transferred charges of the step (i) are horizontally transferred to a position shifted in the predetermined direction of outputting the charges by one of 2n, 2n+1, and 2n+2 rows;
- (iii) among charges stored within the vertical transfer units except the n vertical transfer units, charges stored in the vertical charge storage units located closest to the horizontal transfer unit are vertically transferred to the horizontal transfer unit; and
- (iv) the transferred charges of the steps (ii) and (iii) are horizontally transferred in a 4n+2 phase-mode, and wherein within the vertical transfer group, the transfer electrodes except the independent transfer electrodes are connected transfer electrodes connected with other transfer electrodes of the vertical transfer group, the connected transfer electrodes being applied with an in-phase voltage.

20. The charge transfer method of claim 19, wherein in the step (i), among charges stored within one vertical transfer unit disposed, within the vertical transfer group that is made of three vertical transfer units, on the opposite side from the predetermined direction, charges stored in the vertical charge storage unit located closest to the horizontal transfer unit are vertically transferred to the horizontal transfer unit;

in the step (ii), the transferred charges of the step (i) are horizontally transferred to a position, corresponding to one of 2, 3, and 4 rows of the photoelectric converters, shifted in the predetermined direction of outputting the charges;

in the step (iii), among charges stored within remaining two vertical transfer units, charges stored in the vertical charge storage units located closest to the horizontal transfer unit are vertically transferred to the horizontal transfer unit; and in the step (iv), the transferred charges of the steps (ii) and (iii) are horizontally transferred in a six phase-mode.

* * * * *